United States Patent
Takasu et al.

(10) Patent No.: US 9,429,753 B2
(45) Date of Patent: Aug. 30, 2016

(54) HEAD-UP DISPLAY DEVICE AND DISPLAY UNIT

(71) Applicant: YAZAKI CORPORATION, Tokyo (JP)

(72) Inventors: Katsutoshi Takasu, Shizuoka (JP); Akira Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 11 days.

(21) Appl. No.: 14/325,982

(22) Filed: Jul. 8, 2014

(65) Prior Publication Data

US 2015/0015962 A1    Jan. 15, 2015

(30) Foreign Application Priority Data

Jul. 10, 2013    (JP) ................. 2013-144890

(51) Int. Cl.
*G02B 27/00*    (2006.01)
*G02B 27/01*    (2006.01)

(52) U.S. Cl.
CPC .......... *G02B 27/0101* (2013.01); *G02B 27/01* (2013.01); *G02B 2027/014* (2013.01); *G02B 2027/0141* (2013.01)

(58) Field of Classification Search
CPC .............. G02B 27/0101; G02B 27/01; G02B 2027/014; G02B 2027/0141; G02B 6/00; G09G 3/3406; G09G 3/36; B60K 37/02
USPC ......... 359/630–632, 637, 639, 640; 345/7, 9
See application file for complete search history.

(56) References Cited

U.S. PATENT DOCUMENTS

| | | | |
|---|---|---|---|
| 7,126,583 B1 * | 10/2006 | Breed ............... | B60K 35/00 345/158 |
| 2012/0075708 A1 * | 3/2012 | Hagiwara ......... | B60K 35/00 359/630 |

FOREIGN PATENT DOCUMENTS

JP    2006-11122 A    1/2006

* cited by examiner

*Primary Examiner* — Scott J Sugarman
*Assistant Examiner* — Gary O'Neill
(74) *Attorney, Agent, or Firm* — Kenealy Vaidya LLP

(57) ABSTRACT

On a combiner, a HUD display area is defined by display light from a projector, and guide lights are displayed. An optical path length from the combiner to a display-light projector, an optical path length from the combiner to a first light source, and an optical path length from the combiner to a second light source in a viewing direction are larger in this order.

9 Claims, 17 Drawing Sheets

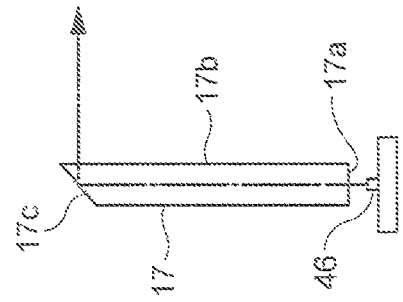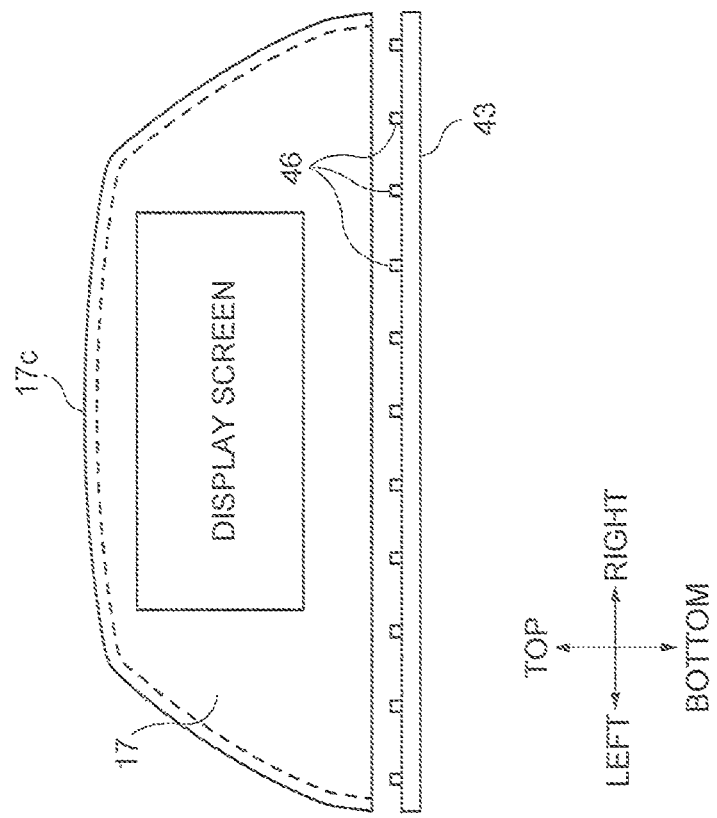

FIG.14
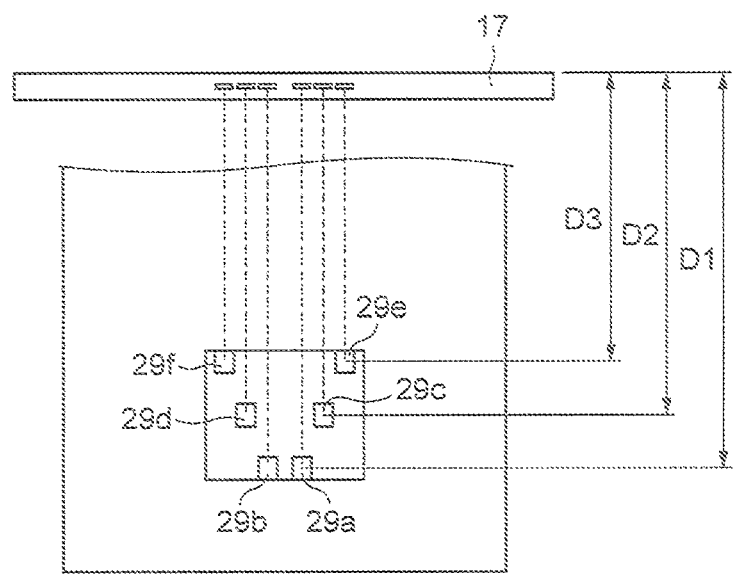
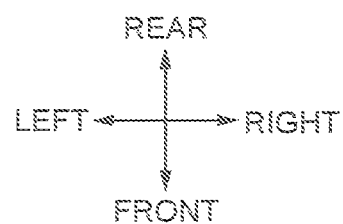

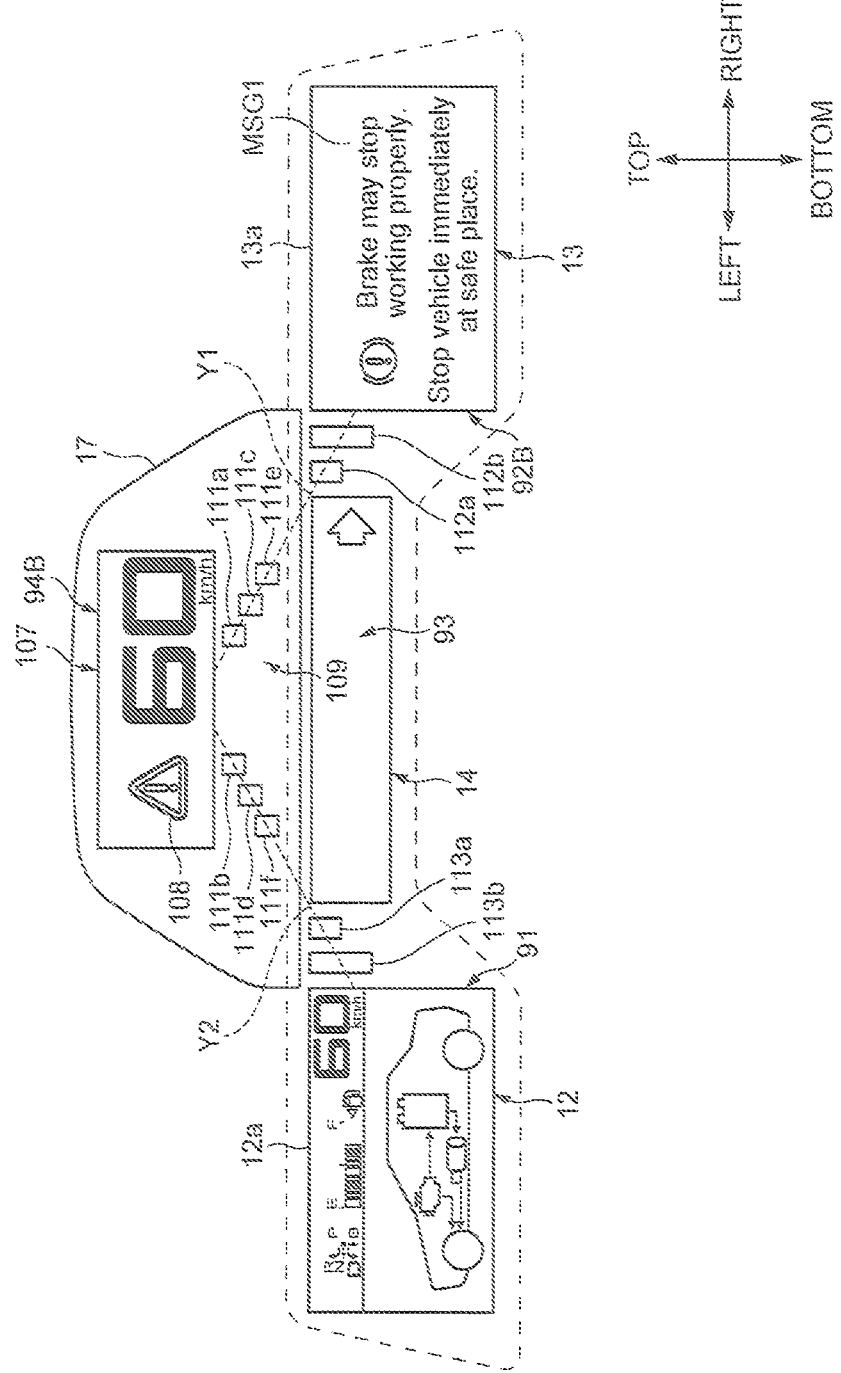

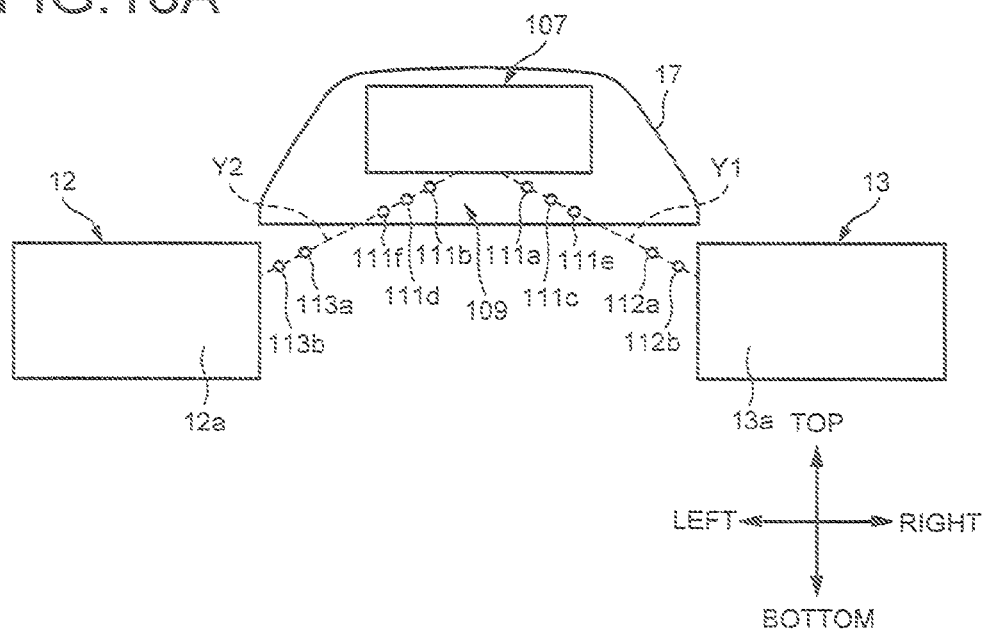
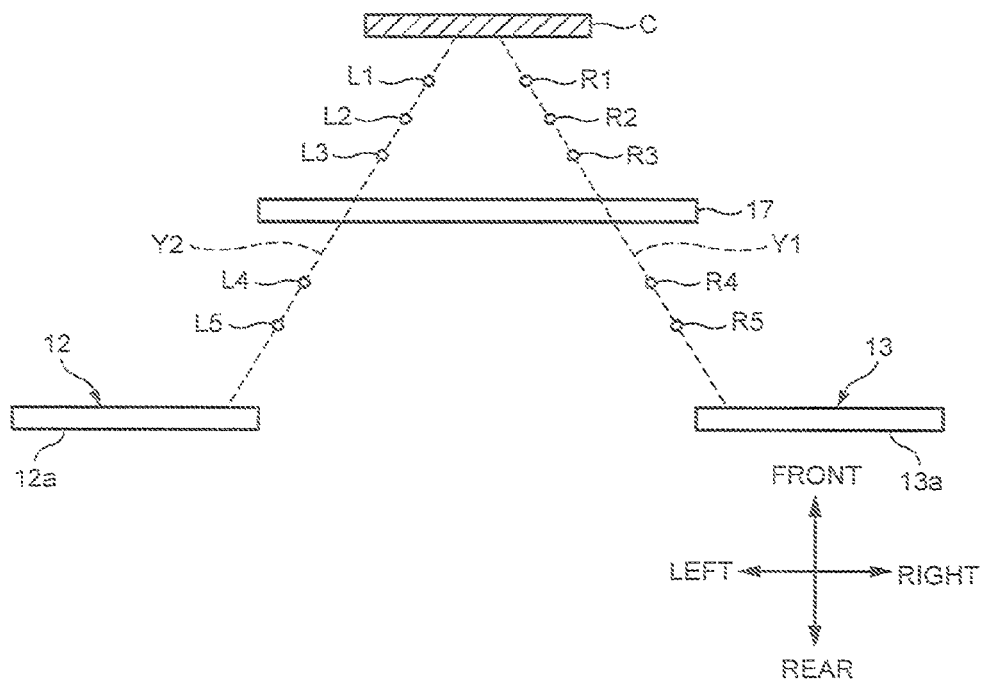

HEAD-UP DISPLAY DEVICE AND DISPLAY UNIT

CROSS-REFERENCE TO RELATED APPLICATIONS

The present application claims priority to and incorporates by reference the entire contents of Japanese Patent Application No. 2013-144890 filed in Japan on Jul. 10, 2013.

BACKGROUND OF THE INVENTION

1. Field of the Invention

The present invention relates to a head-up display device and a display unit, and in particular, to a technology to guide the sight line of a driver.

2. Description of the Related Art

In general, a head-up display device mounted on a vehicle is configured to project display light emitted from a projector on an optical element (half mirror) called a combiner, and reflect light reflected on a surface of the combiner in a viewing direction of a driver so as to guide the light to a predetermined eye point that is a viewing position of the driver (refer to Japanese Patent Application Laid-open No. 2006-011122, for example). The combiner is disposed in a position, such as on the instrument panel in front of the driver's seat, easily viewed by the driver. A front windshield may be used as the reflective surface of the display light, instead of the combiner.

The head-up display device forms a display image as a virtual image in a position in front of the combiner in the direction of vehicle travel (that is, behind the combiner in the viewing direction), and thereby has an advantage that the driver needs to make only slight focus adjustment to view the display image. The head-up display device also allows viewing of a sight in front of the vehicle viewed through the combiner and the display image formed at the front in the travel direction in an overlapping manner, and thereby can show information in a new way different from that of display using an ordinary display panel.

Such a head-up display device can be used, for example, for displaying the traveling speed of the vehicle. The driver can view the speed display without a large amount of movement of the sight line or focus adjustment while facing forward, so that the head-up display device is suitable for displaying important information, such as the vehicle speed.

While a variety of information can be displayed on the combiner of the head-up display device, there are few cases of showing many pieces of information at a time. For example, when malfunction occurs such as a failure in the vehicle, it is often the case that only a warning indication by a symbol, such as an exclamation mark (!), is displayed, and information, such as a text, to explain the content of the malfunction is not displayed. This is for preventing the driver from being disturbed in driving due to blocking of the field of view of the driver, or diverse attention from the front.

Hence, it is conceivable that, when malfunction occurs, the warning indication is displayed on the combiner, and at the same time, the information, such as a text, to explain the content is displayed on another display section, for example, a meter unit. In general, however, the combiner and the display section, for example, the meter unit, are disposed in positions distant from each other in the up-down and/or the left-right direction(s) (that is, in a direction orthogonal to the viewing direction), so that the driver may not notice that the information to explain the content of the malfunction is displayed on the display section, for example, the meter unit.

While the display section of the meter unit displays the information on a display surface thereof, the virtual image displayed by the head-up display device is formed behind the combiner in the viewing direction, and is viewed by the driver. In other words, the image forming position of the display image in the head-up display device and the display screen of the meter unit are distant from each other in the viewing direction. This may also cause the driver to fail to notice that the information to explain the content of the malfunction is displayed on the display section, for example, the meter unit.

Hence, the sight line needs to be guided from the combiner to the display section, for example, the meter unit to lead the driver who is watching the combiner to view the display section, for example, the meter unit.

The present invention has been made in view of the above-described circumstances, and an object thereof is to provide a head-up display device and a display unit that can easily guide the sight line of a driver.

The object described above according to the present invention is achieved by the following configurations.

SUMMARY OF THE INVENTION

It is an object of the present invention to at least partially solve the problems in the conventional technology.

According to one aspect of the present invention, a head-up display device mounted on a vehicle for use, includes a projector configured to project display light including a display image onto a reflecting plate; and a first light source and a second light source configured to project emitted light onto the reflecting plate, wherein the display light from the projector is reflected by the reflecting plate in a viewing direction to define a first display area on the reflecting plate, the emitted light from the first light source is reflected by the reflecting plate in the viewing direction to display a first guiding light in a position adjacent to the first display area on the reflecting plate, the emitted light from the second light source is reflected by the reflecting plate in the viewing direction to display a second guiding light outside the first guiding light on the reflecting plate, and an optical path length from the reflecting plate to the projector, an optical path length from the reflecting plate to the first light source, and an optical path length from the reflecting plate to the second light source in the viewing direction are larger in this order.

According to another aspect of the present invention, when an event involving a need to guide a sight line outward in a first guide direction from the first display area through the first guiding light toward the second guiding light has occurred, the first light source displays the first guiding light, and thereafter, the second light source displays the second guiding light.

According to still another aspect of the present invention, a display unit includes the head-up display device according to claim 1 or 2; and a meter unit configured to include a display section on which a second display area is defined, wherein the display section is disposed in front of the reflecting plate in the viewing direction, and also disposed so that the second display area lies outside in the first guide direction of the second guiding light when viewed from the viewing direction.

According to still another aspect of the present invention, when a warning display is displayed, a warning informing element for informing a warning is displayed on the first display area, and a content explanation element for explaining a content of the warning is displayed on the second display area, and the first light source displays the first guiding light, and thereafter, the second light source displays the second guiding light.

According to still another aspect of the present invention, the meter unit further includes a first meter side light source that displays a first meter side guiding light, and the first meter side guiding light is located between the reflecting plate and the display section in the viewing direction, and configured so as to be viewed as positioned between the second guiding light and the second display area when viewed from the viewing direction.

According to still another aspect of the present invention, the meter unit further includes a second meter side light source that displays a second meter side guiding light, and the second meter side guiding light is disposed between the first meter side guiding light and the display section in the viewing direction, and configured so as to be viewed as positioned between the first meter side guiding light and the second display area when viewed from the viewing direction.

According to still another aspect of the present invention, when an event involving a need to guide the sight line outward in the first guide direction from the first display area has occurred, the first light source displays the first guiding light, and then the second light source displays the second guiding light, and thereafter, the first meter side light source displays the first meter side guiding light, and then the second meter side light source displays the second meter side guiding light.

According to still another aspect of the present invention, the head-up display device further includes: a third light source and a fourth light source configured to project emitted light onto the reflecting plate, wherein the emitted light from the third light source is reflected by the reflecting plate in the viewing direction to display a third guiding light in a position adjacent to the first display area on the reflecting plate, the emitted light from the fourth light source is reflected by the reflecting plate in the viewing direction to display a fourth guiding light outside the third guiding light on the reflecting plate, the optical path length from the reflecting plate to the projector, an optical path length from the reflecting plate to the third light source, and an optical path length from the reflecting plate to the fourth light source in the viewing direction are larger in this order, and the first guide direction intersects a second guide direction that passes through the third guiding light and the fourth guiding light.

According to still another aspect of the present invention, when an event involving a need to guide the sight line outward in the first guide direction from the first display area has occurred, the first light source displays the first guiding light, and thereafter, the second guiding light displays the second guiding light, or when an event involving a need to guide the sight line outward in the second guide direction from the first display area through the third guiding light toward the fourth guiding light has occurred, the third light source displays the third guiding light, and thereafter, the fourth light source displays the fourth guiding light.

The present invention has been briefly explained above. The details of the present invention will further be clarified by reading through the detailed description of the preferred embodiment (hereinafter called the "embodiment") given below with reference to the accompanying drawings.

BRIEF DESCRIPTION OF THE DRAWINGS

FIGS. 9A and 9B are views illustrating the combiner and a combiner illumination substrate, FIG. 9A being a front view, and FIG. 9B being a side view;

FIG. 14 is an explanatory diagram for explaining the light paths of the guide lights by using the ambient light source, and is a plan view illustrating the main substrate assembly and the combiner;

FIG. 17 is a front view illustrating a display example of the entire display unit in a warning display state;

FIGS. 18A and 18B are explanatory diagrams for explaining an arrangement state of the respective guide lights used to guide the sight line, FIG. 18A being a diagram schematically illustrating the state of the display unit as viewed from the viewing direction, and FIG. 18B being a plan view illustrating image forming positions of the respective parts in FIG. 18A.

DETAILED DESCRIPTION OF THE PREFERRED EMBODIMENT

The following describes a specific embodiment with respect to a head-up display device and a display unit according to the present invention, with reference to the drawings.

[Configuration of Mechanical Section]
[Explanation of Overall Outline]

Figure 1:
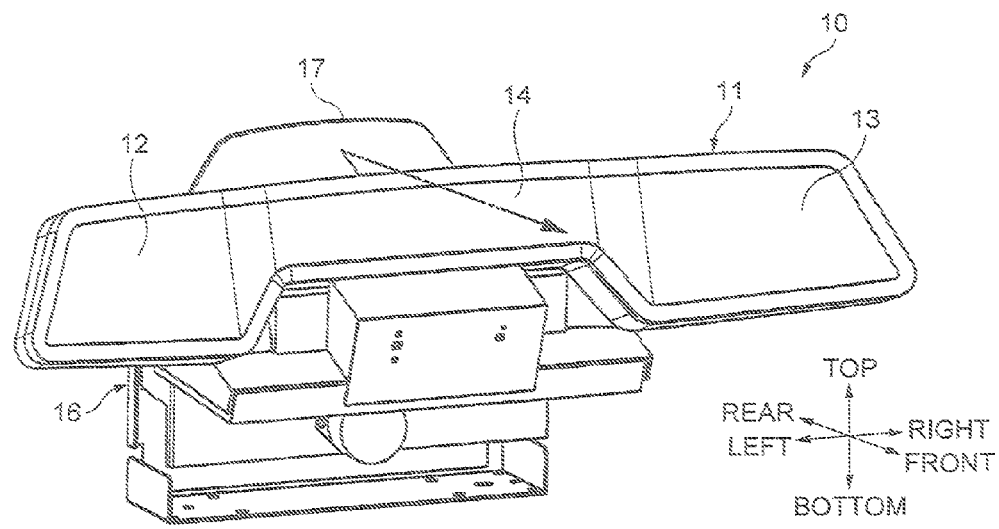
FIG. 1 is a perspective view illustrating an exterior appearance of an entire display unit, as viewed from the front side.
Figure 2:
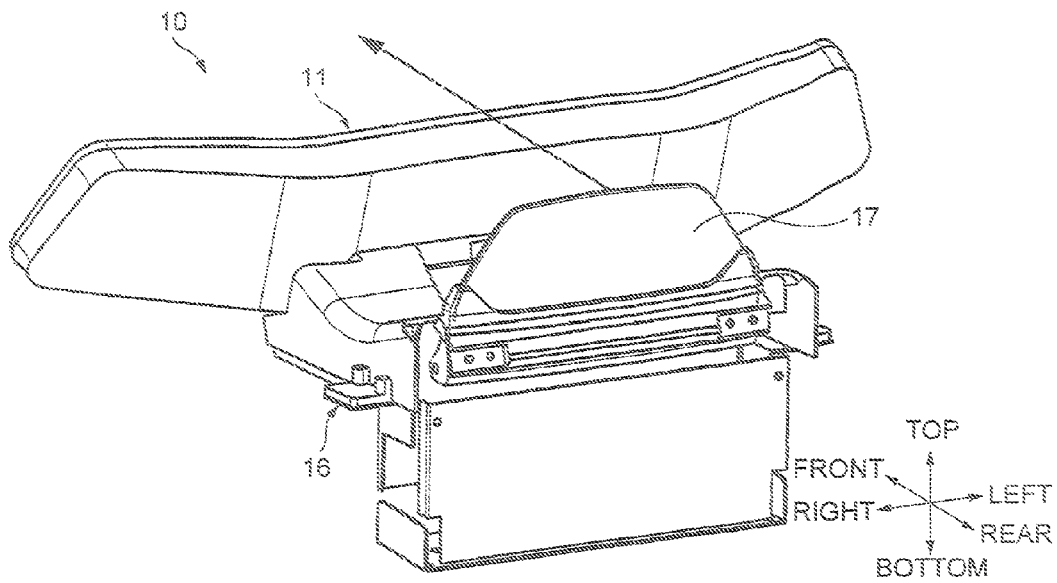
FIG. 2 is a perspective view illustrating the exterior appearance of the entire display unit, as viewed from the rear side.
Figure 3:
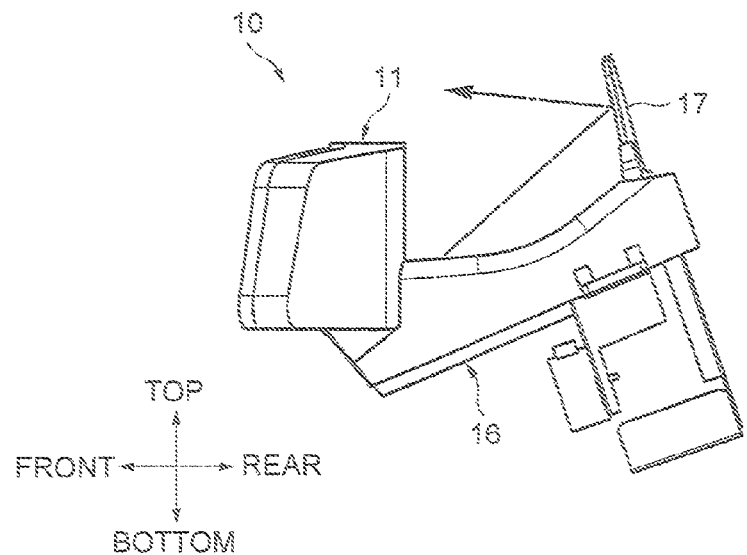
FIG. 3 is a perspective view illustrating the exterior appearance of the entire display unit, as viewed from a lateral side.
Figure 4:
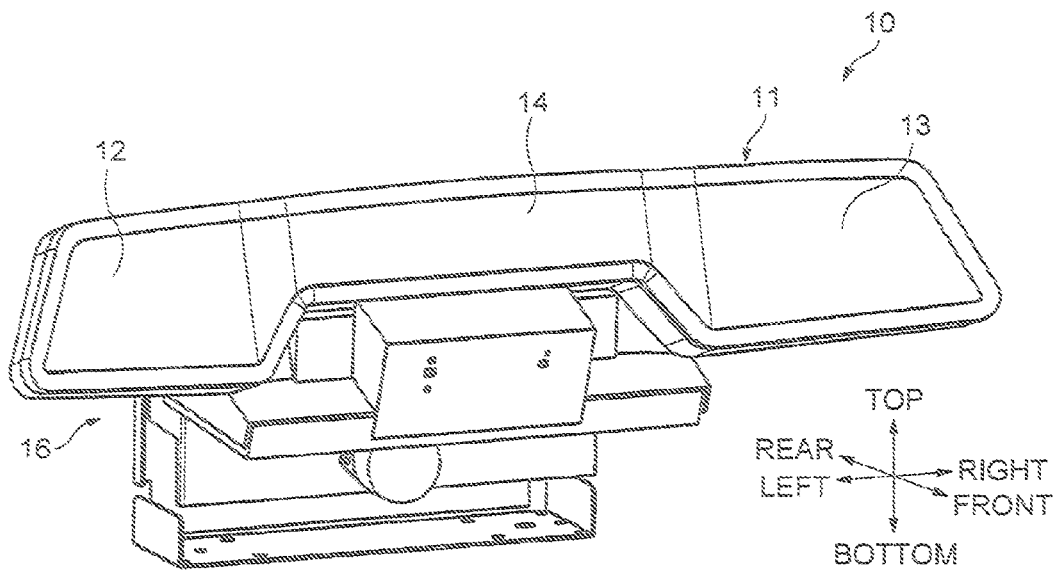
FIG. 4 is a perspective view illustrating the display unit with a combiner retracted, as viewed from the front side.
Figure 5:
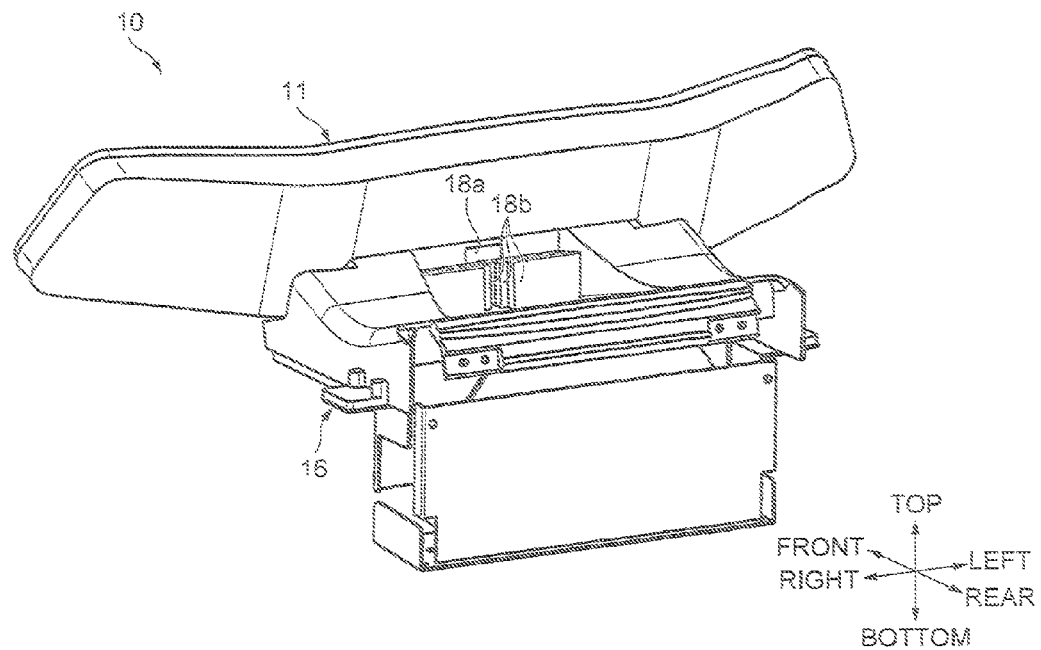
FIG. 5 is a perspective view illustrating the display unit with the combiner retracted, as viewed from the rear side.
Figure 6:
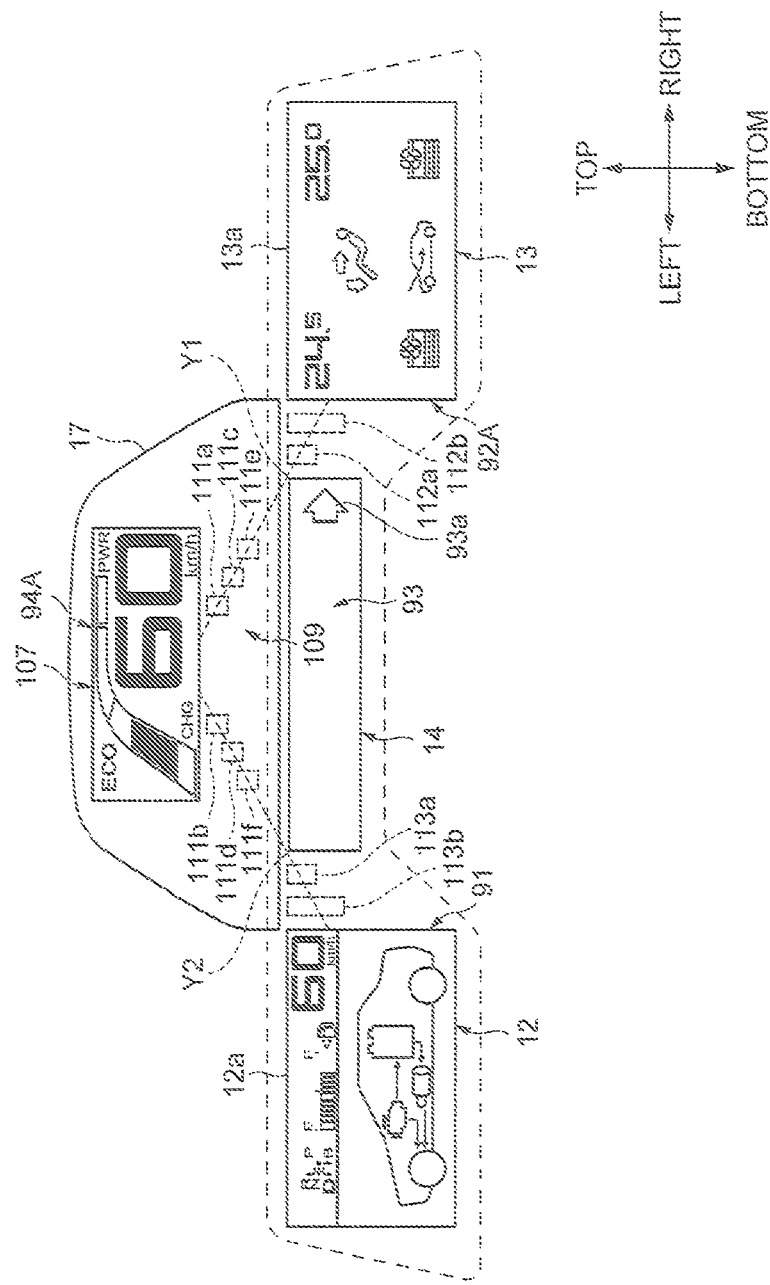
FIG. 6 is a front view illustrating a display example of the entire display unit in a normal driving state.

FIGS. 1 to 3 illustrate perspective views illustrating an exterior appearance of the whole of a display unit 10, as viewed from the front side, the back side, and a lateral side, respectively. FIGS. 1 to 3 illustrate a use state in which a combiner 17 protrudes from a housing. FIGS. 4 and 5 illustrate perspective views of the display unit 10 in a retracted state in which the combiner 17 is retracted in the housing, as viewed from the front side and the back side, respectively. FIG. 6 is a front view illustrating a display example of the entire display unit in a normal driving state.

The directions "left" and "right" illustrated in FIGS. 1 to 6 correspond to the left and the right when the display unit 10 disposed in front of the driver's seat of a vehicle is viewed from the driver's seat. The directions "front" and "rear" illustrated in FIGS. 1 to 6 correspond to the front and the rear directions of the display unit 10. In other words, the direction facing the driver sitting on the driver's seat side is represented as "front", and the back side of the display unit 10 as viewed from the driver is represented as "rear". The directions "top" and "bottom" illustrated in FIGS. 1 to 6 correspond to the up and down directions of the vehicle. The drawings (to be explained later) other than FIGS. 1 to 6 also indicate the directions using "left", "right", "front", "rear", "top", and "bottom", in the same manner.

The display unit 10 illustrated in FIGS. 1 to 6 is a device configured by integrally connecting a meter unit 11 and a head-up display (HUD) device 16. The display unit 10 is embedded inside an instrument panel (not illustrated) of the vehicle, and is disposed in a state of being exposed outside the instrument panel so as to be partially visible to the driver. In particular, the display unit 10 is disposed so that the combiner 17 of the HUD device 16 protrudes from the instrument panel in the use state, and so that combiner 17 is retracted below the instrument panel in the retracted state. In other words, the combiner 17 is visible to the driver in the use state, and invisible to the driver in the retracted state.

As illustrated in FIGS. 1 to 3, the meter unit 11 includes two display sections of a left side display 12 and a right side display 13. As illustrated in FIG. 1, the left side display 12 is disposed on the left side of the meter unit 11, and the right side display 13 is disposed on the right side of the meter unit 11. The meter unit 11 further includes a center display 14 that can display indicator lights for, for example, a warning between the left side display 12 and the right side display 13. Details of these parts will be described later. The meter unit 11 including these display sections is used to display a variety of information useful for driving the vehicle, in the same manner as general meter units for vehicles. For example, a speedometer for displaying the traveling speed of the vehicle and a distance meter for displaying a travel distance thereof are displayed on the meter unit 11. Also, for example, an indicator for displaying a shift position of a transmission lever, a fuel gauge for displaying the amount of remaining fuel, and a warning display section for displaying occurrence of various types of abnormalities are displayed on the meter unit 11. The left side display 12 and the right side display 13 employ liquid crystal display panels capable of graphic display, and thereby can also display, for example, an image (a video) taken by a vehicle-mounted camera. Specifically, a display area is defined on a display surface of each of the left side display 12 and the right side display 13. Hereinafter, the display area of the right side display 13 is called a second display area 13a, and the display area of the left side display 12 is called a third display area 12a (refer to FIG. 6).

The HUD device 16 projects a display image on the plate-like combiner 17 that is a translucent reflecting plate (half mirror) to display a variety of information, and protrudes therefrom the combiner 17 above the center display 14 in the use state as illustrated in FIGS. 1 to 3. This allows, when the display image is displayed on the combiner 17, the driver to view the display image without largely moving the sight line from a position in the normal driving state. The HUD device 16 forms the display image as a virtual image in a position beyond the position of the combiner 17 toward the "rear", so that the driver needs to make only slight focus adjustment to view the display. In this manner, the HUD device 16 can provide a display function that reduces the movement of the sight line and the focus adjustment by the driver, and provides high visibility. The HUD device 16 also allows viewing of a sight in front of the vehicle viewed through the combiner 17 and the display image displayed on the combiner 17 in an overlapping manner, and thereby can show the information in a way different from that of display using an ordinary display panel.

FIG. 6 is a front view illustrating the display example of the entire display unit in the normal driving state. As illustrated in FIG. 6, the combiner 17 positioned above the center display 14 displays thereon high-priority information, such as the current vehicle speed (letters or numerals such as 60 km/h) and an indicator indicating a level of ecological friendliness of driving, as a HUD display content 94A, in a large and easily viewable state. The left side display 12 is disposed on the lower left side of the combiner 17, and the third display area 12a of the left side display 12 displays thereon, for example, display elements indicating the state of a hybrid system, the speedometer, the fuel gauge, and the shift position of the transmission lever, as a left screen display content 91. The right side display 13 is disposed on the lower right side of the combiner 17, and the second display area 13a of the right side display 13 displays thereon display elements indicating the state of air-conditioning, as a right screen display content 92A. The center display 14 displays thereon a central display content 93, and, for example, blinks a right-turn display 93a to notify the driver that the directional indicator is blinking.

While FIG. 6 illustrates a state in which a plurality of guide lights 111a to 111f (to be described later) are not displayed, the guide lights 111a to 111f are configured to be displayable in positions on the combiner 17 indicated by dashed lines in FIG. 6. On the meter unit 11, guide lights 112a and 112b, and guide lights 113a and 113b are respectively displayed in an intermediate position between the right side display 13 and the combiner 17, and in an intermediate position between left side display 12 and the combiner 17. The display unit 10 according to the present embodiment uses these guide lights to guide the sight line of the driver. Processes to guide the sight line will be described later.

[Explanation of Detailed Configurations of Respective Units]

Figure 7:
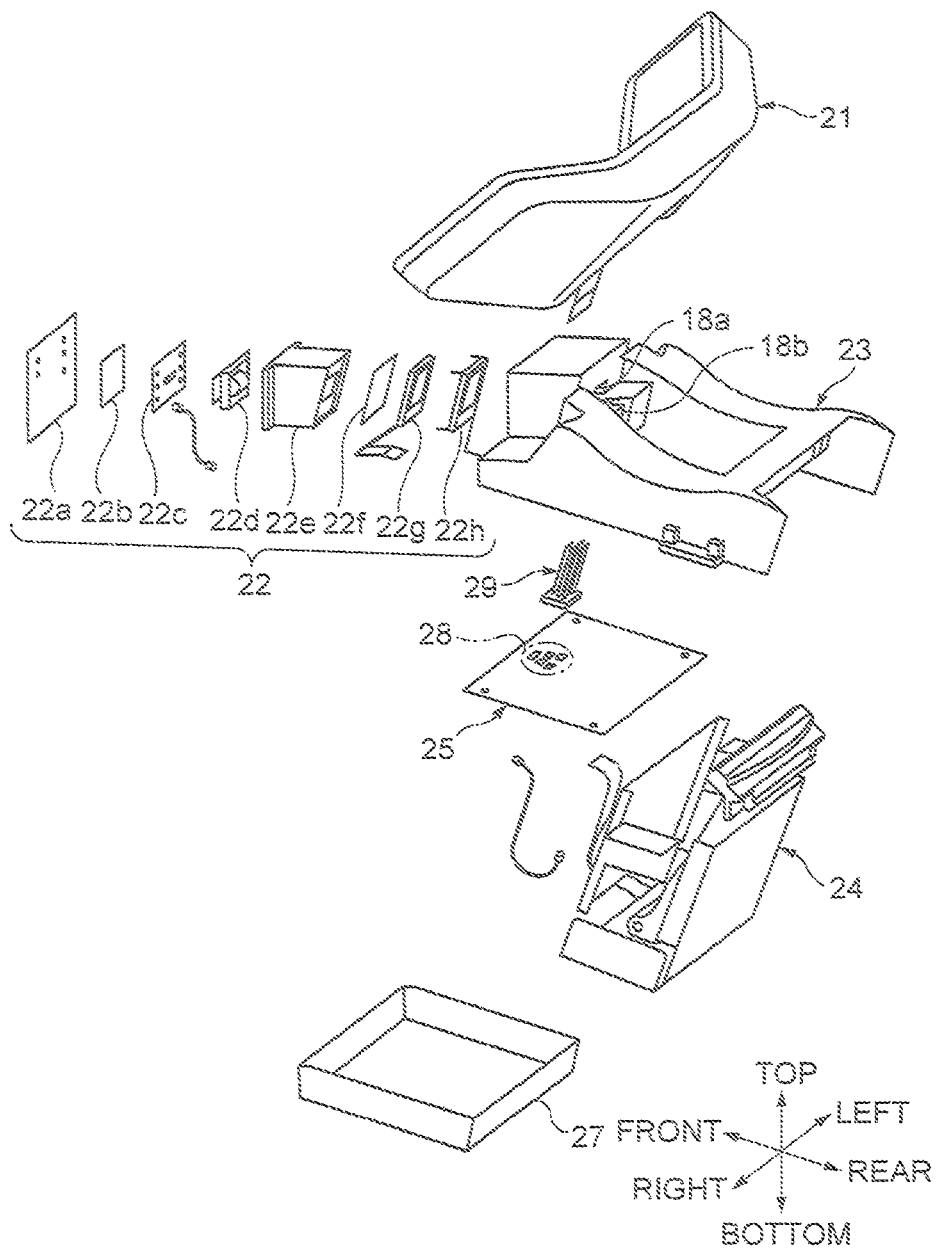
FIG. 7 is an exploded perspective view illustrating an outline of a configuration of the entire display unit.

FIG. 7 illustrates a state in which the display unit 10 has been disassembled into main components.

As illustrated in FIG. 7, the display unit 10 includes a meter assembly 21, a display-light projector 22, a projector case 23, a drive unit assembly 24, a main substrate assembly 25, a cover 27, an ambient light source 28, and an ambient prism unit 29 for ambient light.

[Explanation of Display-Light Projector 22]

The display-light projector 22 has a function to project display light including the display image displayed by the HUD device 16 toward the combiner 17.

As illustrated in FIG. 7, the display-light projector 22 includes, in the order from the front side, a heat sink 22a, a heat conductive sheet 22b, a backlight substrate 22c, a lens array 22d, a backlight case 22e, a diffusion sheet 22f, a liquid crystal display 22g, and a shielding case 22h.

The liquid crystal display 22g has a plurality of two-dimensionally arranged display pixels, and can individually control, for example, on and off of display, and the display color of each of the pixels. The liquid crystal display 22g can thereby display any visible information, such as graphics, texts, and images on a screen.

The liquid crystal display 22g is a transmissive liquid crystal panel, and can project the display light including the display image displayed on the screen by being illuminated from the rear side by a backlight disposed on the backlight substrate 22c. As illustrated in FIGS. 5 and 7, the display light is projected from a display light output opening 18a that is an opening provided at the projector case 23 toward the combiner 17 (refer also to FIG. 12 to be explained later).

The combiner 17 is built into the drive unit assembly 24, and is supported thereon so as to be movable in the up-down direction. In a display state of the HUD device 16, the combiner 17 moves to a position protruding from the drive unit assembly 24, and reflects the display light emitted from the display-light projector 22. The light reflected on a reflective surface of the combiner 17 advances toward a predetermined eye point corresponding to a position of eyes of the driver. In other words, the light reflected on the reflective surface of the combiner 17 advances in a viewing direction of the driver. This allows the driver to view the visible information displayed on the screen of the liquid crystal display 22g as a virtual image displayed on the combiner 17.

[Explanation of Outline of Ambient Light Display]

The present embodiment can display light other than the display image by the liquid crystal display 22g as a virtual image by projecting the light on the surface of the combiner 17. For that purpose, the ambient light source 28 is provided on the main substrate assembly 25. The ambient prism unit 29 for ambient light is disposed in a position facing the ambient light source 28. The ambient light source 28 is constituted by a plurality of light-emitting diodes (LEDs). The ambient prism unit 29 for ambient light is constituted by a plurality of prisms disposed in positions facing the respective light-emitting diodes.

The light obtained by emission of light of the ambient light source 28 enters the ambient prism unit 29 for ambient light from below, then is reflected on surfaces near the top thereof, and is projected from ambient light output openings 18b provided at the projector case 23 (refer to FIGS. 5 and 7) toward the combiner 17. This ambient light is also reflected on the reflective surface of the combiner 17, and advances in the viewing direction of the driver. Hence, when the ambient light source 28 emits light, the driver can also see this light as a virtual image displayed on the combiner 17.

Regarding the display of a plurality of such ambient light beams, the present embodiment is configured to be capable of three-dimensional display using differences in optical path length. This ambient light display can display the respective guide lights 111a to 111f on the combiner 17 illustrated in FIG. 6. Details of this structure will be described later.

[Explanation of Meter Assembly 21]

Figure 8:
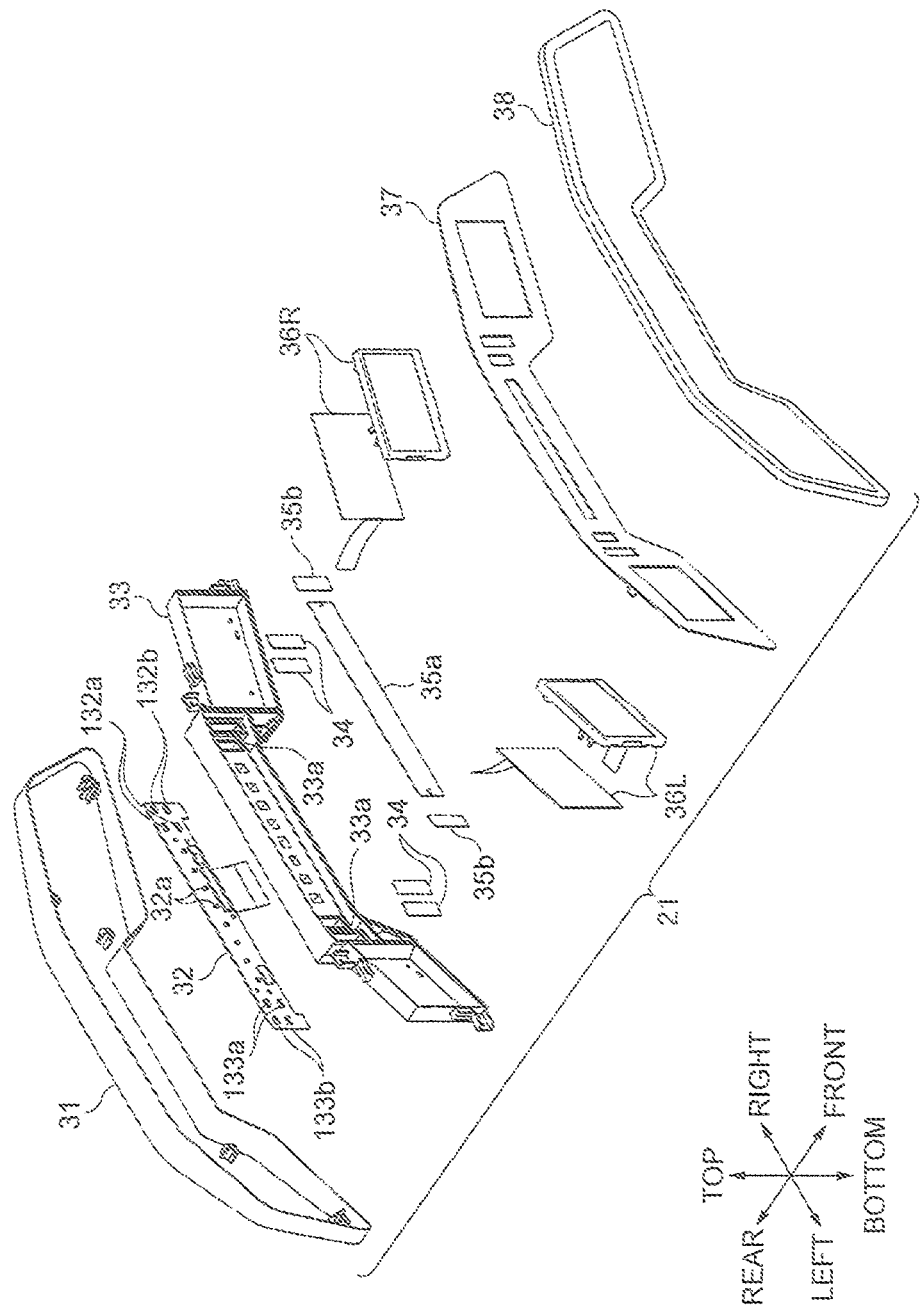
FIG. 8 is an exploded perspective view illustrating a configuration of a meter subassembly.

A main body of the meter unit 11 is configured as the meter assembly 21. FIG. 8 illustrates a state in which the meter assembly 21 has been disassembled into main components.

As illustrated in FIG. 8, the meter assembly 21 includes, in the order from the rear side, a rear cover 31, a substrate 32, a case 33, a plurality of diffusion sheets 34, telltale lenses 35a and 35b, a meter left display 36L and a meter right display 36R, a facing plate 37, and a front glass 38.

The substrate 32 has a rectangular shape extending in the left-right direction, and has light emitters 132a (first meter side light source) and 132b (second meter side light source) disposed near the right end thereof, and light emitters 133a (third meter side light source) and 133b (fourth meter side light source) disposed near the left end thereof. The light emitters 132b and 133b are disposed outside the light emitters 132a and 133a. Light emitters 32a are arranged side by side in the left-right direction between the right and left light emitters. These light emitters are constituted by a plurality of independent light-emitting diodes. Each of these light emitters is constituted by a pair of light-emitting diodes, one emitting light in red, and the other emitting light in green.

Output light from the respective light emitters is emitted in the "front" direction, and after sequentially passing through openings of the case 33, the diffusion sheets 34, the telltale lenses 35a and 35b, and openings of the facing plate 37, is displayed as display light for, for example, various warnings on a surface of the front glass 38. The display light from light emitters 32c is displayed on the above-described center display 14, and is viewed as telltale display by the driver. The front glass 38 is tinted to be made translucent.

Lighting the light emitter 132a can display the guiding light 112a (first meter side guiding light) illustrated in FIG. 6. Lighting the light emitter 132b can display the guiding light 112b (second meter side guiding light) illustrated in FIG. 6. In the same manner, lighting the light emitters 133a can display the guiding light 113a, and lighting the light emitters 133b can display the guiding light 113b.

As illustrated in FIG. 8, of the diffusion sheets 34 serving as diffusing positions for the output light from the respective light emitters, those for the light emitters 132a and 133a and those for the light emitters 132b and 133b are disposed in different positions in the front-rear direction. Specifically, stepped portions 33a are provided at the case 33, and the diffusion sheets 34 for the light emitters 132b and 133b are disposed in front of the diffusion sheets 34 for the light emitters 132a and 133a. This causes the guide lights 112a and 113a displayed by the output light from the light emitters 132a and 133a to be viewed by the driver as being lit behind the guide lights 112b and 113b displayed by the output light from the light emitters 132b and 133b.

The meter left display 36L and the meter right display 36R are independent color liquid crystal display panels, and have a plurality of two-dimensionally arranged display pixels. Each of the two-dimensionally arranged display pixels of the meter left display 36L and the meter right display 36R can individually be controlled to show, for example, on and off of display, and to change the display color. The meter left display 36L and the meter right display 36R can thereby display any visible information, such as graphics, texts, and images on screens thereof.

Display contents of the respective screens of the meter left display 36L and the meter right display 36R are displayed on the surface of the front glass 38 through the openings of the facing plate 37. A display content of the meter left display 36L is displayed on the above-described left side display 12 and viewed by the driver, and a display content of the meter right display 36R is displayed on the above-described right side display 13 and viewed by the driver.

[Configuration Near Combiner]

Figure 10:
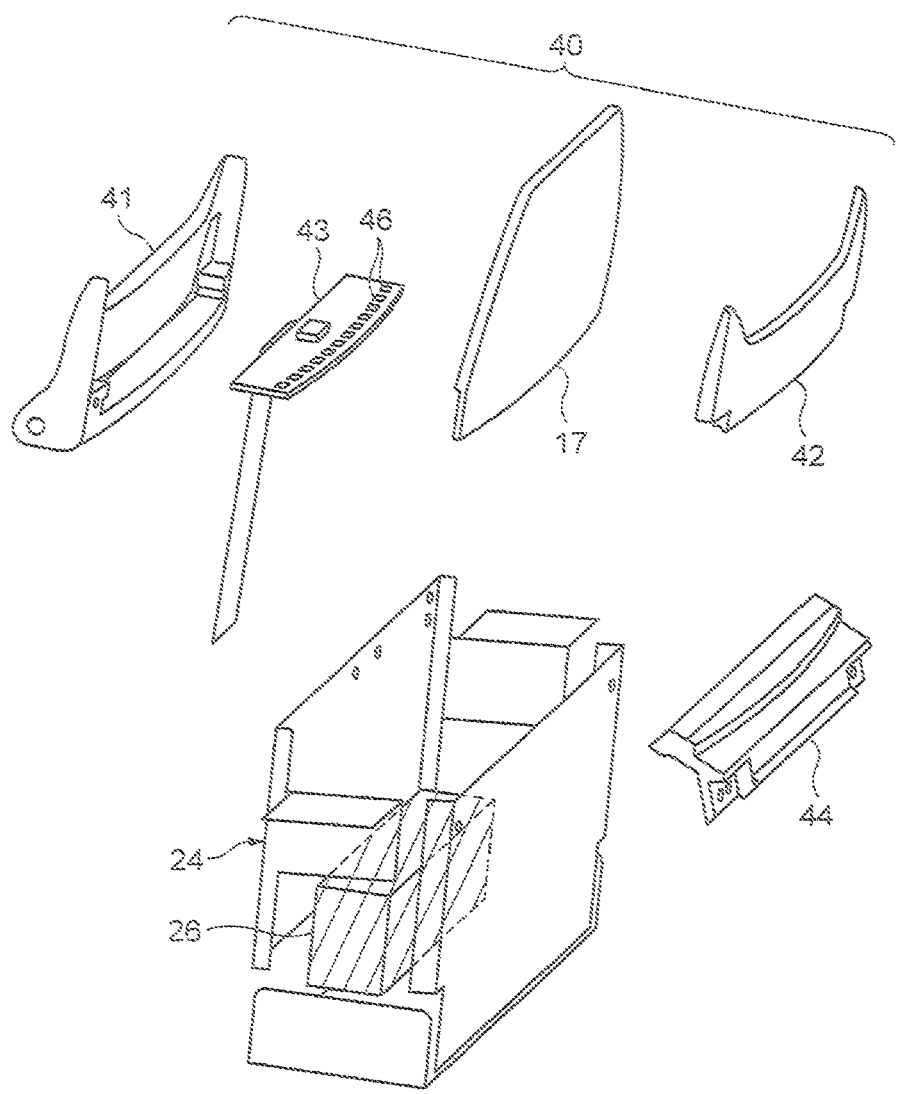
FIG. 10 is an exploded perspective view illustrating a configuration of a driving unit subassembly.

FIGS. 9A and 9B illustrate views of the combiner 17 and a combiner illumination substrate 43 viewed from the front side and a lateral side, respectively. FIG. 10 illustrates an exploded perspective view illustrating main components of a driving unit subassembly 40 housed in the drive unit assembly 24.

As illustrated in FIG. 10, the driving unit subassembly 40 includes the combiner 17, a front combiner holder 41, a rear combiner holder 42, and the combiner illumination substrate 43. Specifically, the combiner 17 is sandwiched between the front combiner holder 41 and the rear combiner holder 42, and integrally held by these members.

The sheet-like combiner illumination substrate 43 is disposed in a position supporting the lower end of the combiner 17. An end face lighting source 46 is provided on the upper surface of the combiner illumination substrate 43. The end face lighting source 46 is constituted by a plurality of light-emitting diodes arranged in a row in the left-right direction.

This arranges the end face lighting source 46 of the combiner illumination substrate 43 in a positional relation of facing the lower end face of the combiner 17, as illustrated in FIGS. 9A, 9B, and 10. An illumination light entrance portion 17a that guides illumination light of the end face lighting source 46 toward inside the combiner 17 is provided on the lower end face of the combiner 17. An illumination light reflective portion 17c is provided on the upper end face and end faces in the left-right direction that correspond to an end in directions orthogonal to the width direction of the combiner 17. As illustrated in FIGS. 9A and 9B, in the present embodiment, the illumination light reflective portion 17c on the upper end face is provided as a slant surface inclined so as to be farther from the combiner illumination substrate 43 toward the front side. The illumination light reflective portion 17c on the end faces in the left-right direction are provided as slant surfaces inclined so as to spread outward in the circumferential direction toward the front side. The slant surfaces provided at the end of the combiner 17 reflect forward the illumination light from the end face lighting source 46. The illumination light reflective portion 17c provided at the combiner 17 may be provided over the entire end faces on the upper side and in the left-right direction of the combiner 17 as in the case of the present embodiment, or may be partially provided on the end faces. The illumination light reflective portion 17c may be provided, for example, on only either of the upper end face and the end faces in the left-right direction.

A description will be made of paths of the display light projected from the display-light projector 22 and the illumination light emitted from the end face lighting source 46.

The display light projected from the display-light projector 22 passes through the display light output opening 18a, and after entering a display light reflective surface 17b that is a surface on one side (front side) in the width direction of the combiner 17 and being reflected on this surface, advances toward the predetermined eye point corresponding to the position of eyes of the driver. This causes the driver to view the display image included in the display light.

While the end face lighting source 46 is emitting light, the illumination light obtained by the light emission of the end face lighting source 46 is guided from the illumination light entrance portion 17a into the combiner 17, and after being transmitted in the combiner 17 and reflected on the surface of the illumination light reflective portion 17c, advances toward the eye point as illustrated in FIG. 9B. This causes the driver to view a state in which the end of the combiner 17 is illuminated in a belt-shape, as illustrated in FIG. 9A. In this manner, compared with conventional HUD devices that project the display image only on the surface of the combiner 17, the HUD device 16 of the display unit 10 can illuminate the side end faces of the combiner 17, and thereby can obtain a new visual effect.

The driving unit subassembly 40 illustrated in FIG. 10 is housed in the drive unit assembly 24, and is coupled with a drive mechanism 26. The drive mechanism 26 can move the driving unit subassembly 40 including the combiner 17 in the up-down direction with a driving force thereof, and can position the driving unit subassembly 40 into a position of the retracted state in which the entire combiner 17 is housed in the drive unit assembly 24 and into a position in which the combiner 17 protrudes above the instrument panel. While the combiner 17 is in the position of the retracted state, an instrument panel cover 44 illustrated in FIG. 10 covers an opening of the instrument panel.

[Detailed Explanation of Ambient Light Display]

Figure 11:
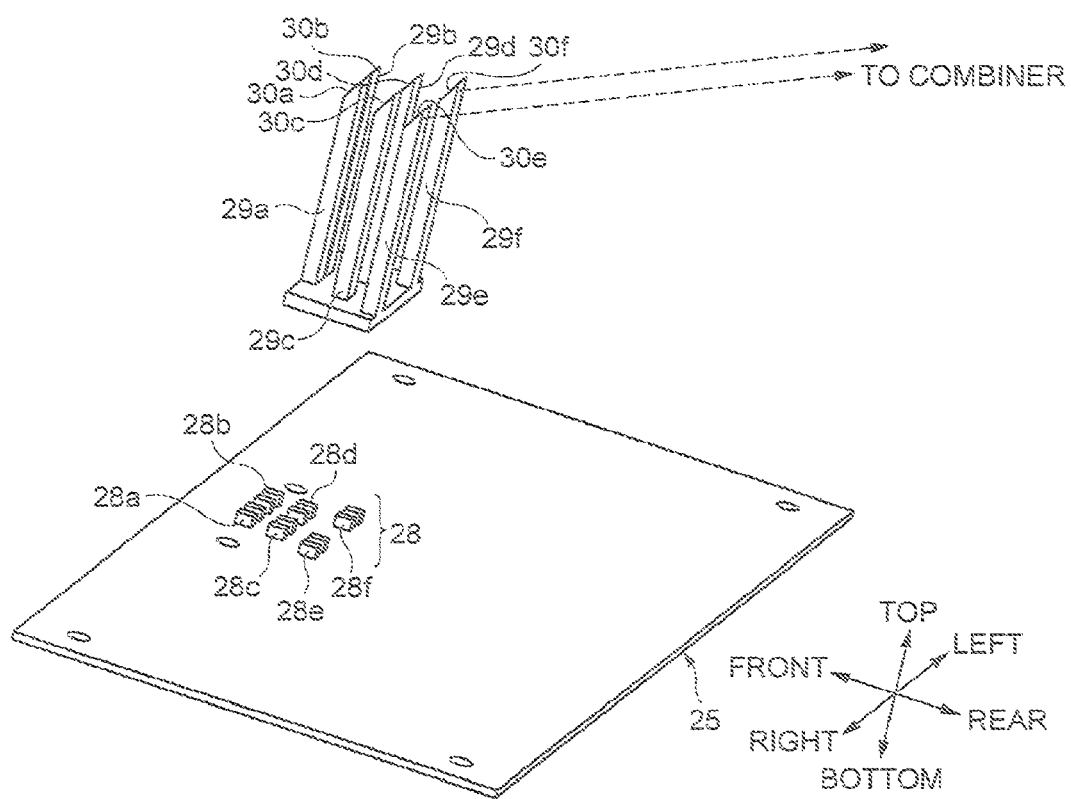
FIG. 11 is an enlarged view illustrating a main substrate assembly.
Figure 12:
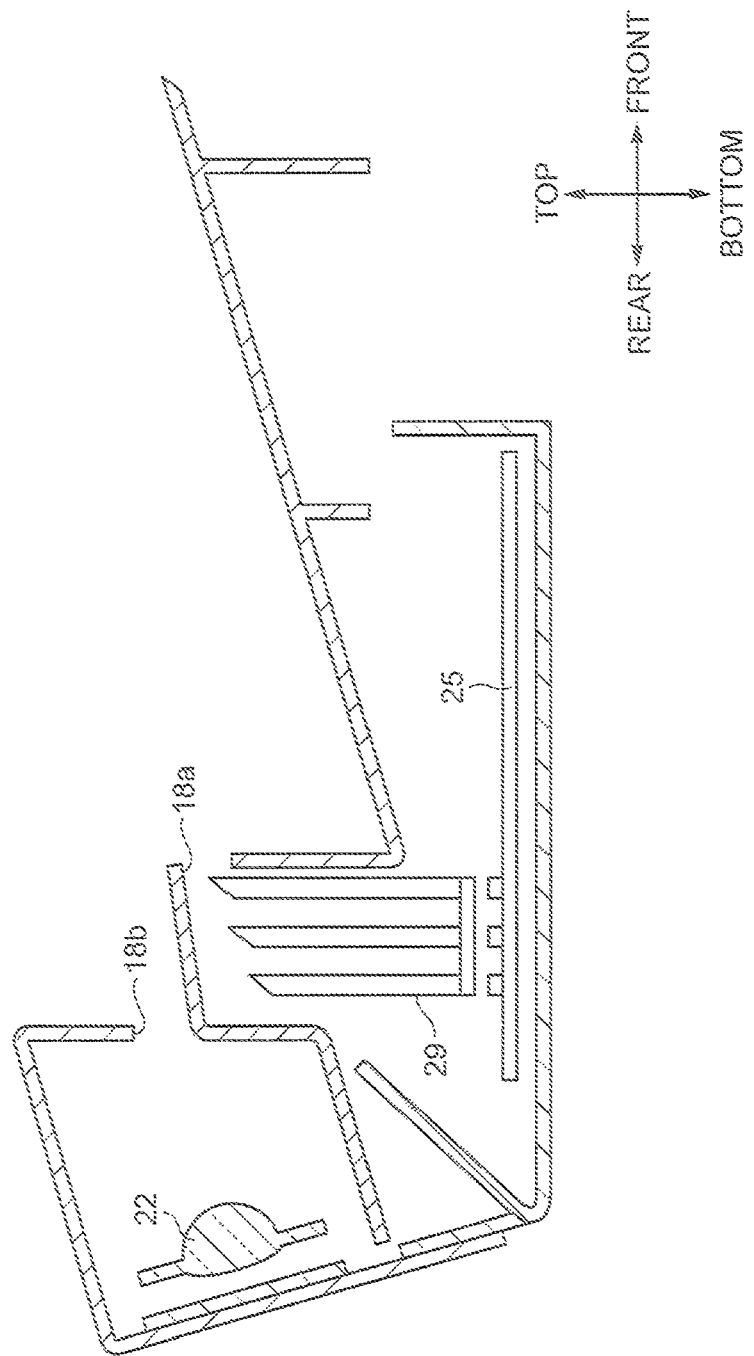
FIG. 12 is an explanatory diagram for explaining an arrangement state of the main substrate assembly, and is a side view illustrating the main substrate assembly.
Figure 13:
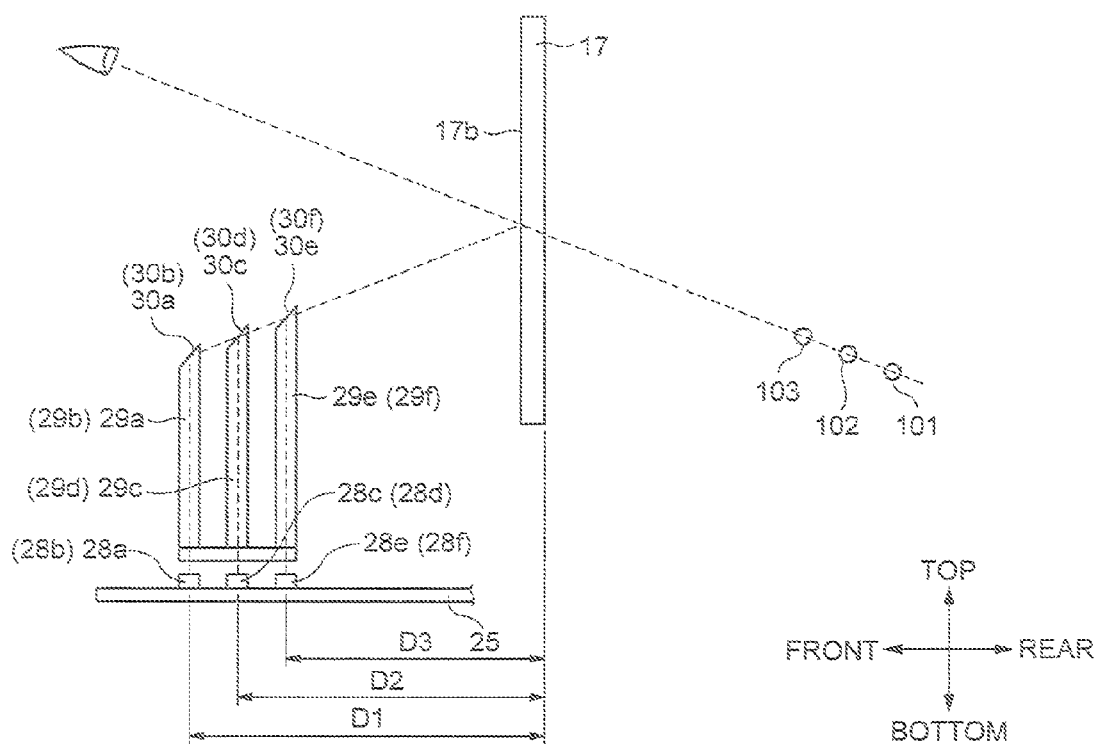
FIG. 13 is an explanatory diagram for explaining light paths of guide lights by using an ambient light source, and is a side view illustrating the main substrate assembly and the combiner.

FIG. 11 is an enlarged view illustrating the main substrate assembly, and FIGS. 12 to 14 are explanatory diagrams, FIG. 12 being a side view illustrating the main substrate assembly, and FIGS. 13 and 14 being a side view and a plan view illustrating the main substrate assembly and the combiner.

As illustrated in FIG. 11, the ambient prism unit 29 for ambient light is constituted by six prisms 29a, 29b, 29c, 29d, 29e, and 29f that are disposed in positions different from each other in the plane of the main substrate assembly 25. The six prisms extend in the up-down direction, and are connected at longitudinal ends thereof to be integrally formed as a whole. The other ends (near the tops) of the respective prisms are pointed at an acute angle, and define light reflective surfaces 30a, 30b, 30c, 30d, 30e, and 30f that reflect the output light from the ambient light source 28 (to be described later) toward the combiner 17.

In the present embodiment, the prisms 29a and 29b disposed in positions adjacent to each other in the left-right direction form a pair; in the same manner, the prisms 29c and 29d form another pair, and the prisms 29e and 29f form still another pair. As illustrated in FIG. 14, in the left-right direction, the distance between the prisms 29a and 29b is the smallest, and the prisms 29c and 29d are disposed outside the prisms 29a and 29b, respectively. The prisms 29e and 29f are disposed outside the prisms 29c and 29d, respectively. As illustrated in FIG. 14, each pair of the prisms are arranged side by side in the left-right direction so that the centers thereof coincide with each other in the left-right direction.

As illustrated in FIG. 13, the three pairs of prisms 29a and 29b, 29c and 29d, and 29e and 29f are arranged in positions shifted from each other in the front-rear direction. In the present embodiment, the three pairs of prisms are arranged from the side farthest from the combiner 17 (from the front), in the order of the prisms 29a and 29b, 29c and 29d, and 29e and 29f.

The ambient light source 28 is constituted by six light sources 28a to 28f. As illustrated in FIG. 11, each of the six light sources 28a to 28f is constituted by a pair of light-emitting diodes, one emitting light in red, and the other emitting light in green. The six light sources 28a to 28f are disposed in positions facing the lower end faces of the prisms 29a to 29f, as illustrated in FIGS. 11 to 14.

As illustrated in FIG. 13, the light emitted from the light source 28a enters the prism 29a, then passes through the inside of the prism 29a and is reflected on the light reflective surface 30a provided near the top of the prism 29a, and advances toward the combiner 17 through one of the ambient light output openings 18b illustrated in FIG. 12 (refer also to FIGS. 5 and 7). This light is reflected in the viewing direction on the display light reflective surface 17b of the combiner 17 as illustrated in FIG. 13, and advances toward the eye point corresponding to the position of eyes of the driver. In this case, the image seen by the eyes of the driver is viewed through the combiner 17 as a virtual image 101 located in a position beyond the combiner 17.

In the same manner, the light emitted from the light source 28c enters the prism 29c, then passes through the inside of the prism 29c and is reflected on the reflective surface near the top of the prism 29c, and advances toward the combiner 17. This light is reflected in the viewing direction on the combiner 17, then advances toward the eye point, and is viewed as a virtual image 102 by the driver. The light emitted from the light source 28e enters the prism 29e, then passes through the inside of the prism 29e and is reflected on the surface near the top of the prism 29e, and advances toward the combiner 17. This light is reflected in the viewing direction on the combiner 17, then advances toward the eye point, and is viewed as a virtual image 103 by the driver. The same applies to the output light of the other light sources 28b, 28d, and 28f.

Because the three pairs of prisms 29a and 29b, 29c and 29d, and 29e and 29f are arranged in the positions shifted from each other in the front-rear direction, optical paths through which the output light of the three pairs of prisms passes have different lengths from each other's optical paths. Specifically, distances in the viewing direction of the driver (front-rear direction) between the respective prisms 29a to 29f and the combiner 17 differ, as given as distances D1, D2, and D3 illustrated in FIGS. 13 and 14, so that differences also occur, corresponding to the distances D1, D2, and D3, in lengths of the optical paths through which the light beams emitted from the light sources 28a and 28b, 28c and 28d, and 28e and 28f travel until reaching the eye point.

According to such differences in the optical path length, the light beams emitted from the light sources 28a and 28b form images in the position of the virtual image 101; the light beams emitted from the light sources 28c and 28d form images in the position of the virtual image 102; and the light beams emitted from the light sources 28e and 28f form images in the position of the virtual image 103. In other words, the virtual images 101 to 103 illustrated in FIG. 13 are formed in positions different from each other in the depth direction as viewed from the driver, and as a result, are viewed as being lit in different positions in the front-rear directions.

The guide lights 111a to 111f illustrated in FIG. 6 can be displayed with the virtual images 101, 102, and 103. As a result, the image forming positions of the guide lights 111a to 111f are shifted from each other in the front-rear direction.

As illustrated in FIG. 12, the display-light projector 22 is disposed behind the ambient light source 28. This makes the optical path length from the display-light projector 22 to the combiner 17 larger than the distances D1, D2, and D3. This, in turn, causes the virtual images 101 to 103 to be formed behind the display image displayed on the combiner 17, thus locating the image forming positions of the guide lights 111a to 111f behind the display image.

[Configuration of Electrical Circuit]

Figure 15:
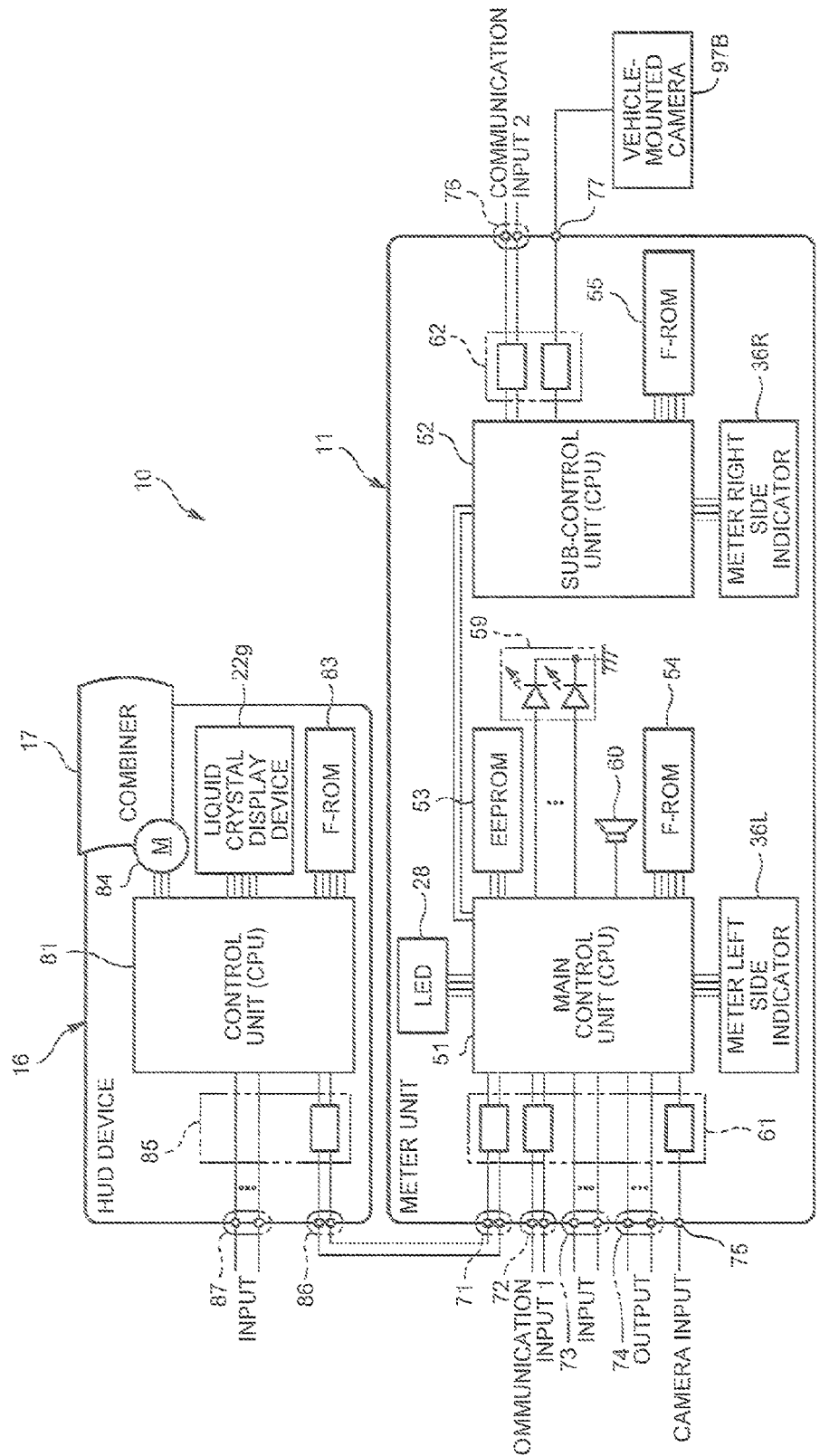
FIG. 15 is a block diagram illustrating a configuration of an electrical circuit of the entire display unit.

FIG. 15 illustrates a configuration of an electrical circuit of the entire display unit 10.

[Explanation of Meter Unit 11]

As illustrated in FIG. 15, the electrical circuit of the meter unit 11 includes a main controller 51, a sub-controller 52, memories 53 to 55, the meter left display 36L, the meter right display 36R, the ambient light source 28, a light emitter 59, a speaker 60, and interfaces 61 and 62.

Each of the main controller 51 and the sub-controller 52 is constituted by an independent microcomputer (central processing unit [CPU]). The memory 53 is an electrically rewritable read-only memory (electrically erasable programmable read-only memory [EEPROM]). The memories 54 and 55 are flash memories (F-ROMs). The memories 53 and 54 store in advance, for example, programs, various constants, data for display necessary for operation of the main controller 51. The memory 55 stores in advance, for example, programs, various constants, data for display necessary for operation of the sub-controller 52.

The light emitter 59 is a component including the light emitters 132a, 132b, 133a, 133b, and 32a illustrated in FIG. 8 and the end face lighting source 46 illustrated in FIGS. 9A, 9B, and 10.

The main controller 51 and the sub-controller 52 are connected via a communication line so as to be capable of communicating with each other. This allows the main controller 51 to exchange necessary information with the sub-controller 52 and control the sub-controller 52.

The electrical circuit of the meter unit 11 includes a plurality of terminals connected to the main controller 51 via the interface 61. Specifically, a connector 71, a communication input part 72, an input part 73, an output part 74, and a camera input part 75 are connected to the interface 61. The electrical circuit of the meter unit 11 also includes a communication input part 76 and a camera input part 77 that are connected to the sub-controller 52 via the interface 62.

The connector 71 of the meter unit 11 is connected to the HUD device 16 via a communication line. This allows the main controller 51 to exchange necessary information with the HUD device 16 and control the HUD device 16.

Each of the respective communication input parts 72 and 76 is connected to various electronic control units (ECUs) that control the vehicle via a communication network on the vehicle. This allows the main controller 51 and the sub-controller 52 on the meter unit 11 to receive a variety of information about the vehicle from the electronic control units on the vehicle. For example, the main controller 51 and the sub-controller 52 can receive information on the current vehicle speed and signals including positional information of the driver's own vehicle from a position detecting device, such as a global positioning system (GPS) receiver, and can also receive signals including information on toll collection from electronic toll collection (ETC) system vehicle-mounted equipment. The input part 73 of the meter unit 11 can be connected to various input devices, such as various switches and sensors, including, but not limited to, a cancel switch (not illustrated) to be described later. The output part 74 of the meter unit 11 can be connected to various output devices.

The camera input parts 75 and 77 of the meter unit 11 can be connected to respective outputs of vehicle-mounted cameras 97B. In other words, signals of videos obtained by photographing by the cameras can be entered from the camera input parts 75 and 77 to the meter unit 11.

The main controller 51 performs various processes according to the already embedded programs, and updates the information displayed on the screen of the meter left display 36L while performing collection and communication of various types of data. The main controller 51 can further perform, for example, lighting control of the ambient light source 28, lighting control of the light emitter 59, output control of the speaker 60, control of the sub-controller 52, and control of the HUD device 16.

The sub-controller 52 performs various processes according to the already embedded programs, receives data from the communication input part 76 and the camera input part 77, and updates the information displayed on the screen of the meter right display 36R. The sub-controller 52 also updates the information displayed on the screen of the meter right display 36R according to instructions from the main controller 51.

[Explanation of HUD Device 16]

As illustrated in FIG. 15, the electrical circuit of the HUD device 16 includes a control unit 81, the liquid crystal display 22g, a memory 83, an electric motor 84, an interface 85, a connector 86, and an input part 87.

The control unit 81 is constituted by a microcomputer (CPU). The memory 83 is a flash memory (F-ROM), and stores in advance, for example, programs, various constants, data for display necessary for operation of the HUD device 16.

The electric motor 84 is a stepper motor, and is coupled with the drive mechanism 26 built into the drive unit assembly 24 illustrated in FIG. 7. Specifically, driving the electric motor 84 can move the driving unit subassembly 40 including the combiner 17 in the up-down direction.

The connector 86 and the input part 87 are connected to the control unit 81 via the interface 85. The connector 86 is connected to the meter unit 11 via the communication line. The input part 87 can be connected to various input devices, such as various switches and sensors. For example, the input part 87 is connected to an operating switch for instructing start/stop of the HUD display.

The control unit 81 performs various processes according to the already embedded programs, and updates the information displayed on the screen of the liquid crystal display 22g while performing collection and communication of various types of data via the connector 86 or the input part 87. Furthermore, the control unit 81 drives the electric motor 84 according to the instruction of start/stop of the HUD display, and thus sets the position of the combiner 17 in a predetermined display position or a predetermined retracted position.

[Explanation of Main Control Operation]

Figure 16:
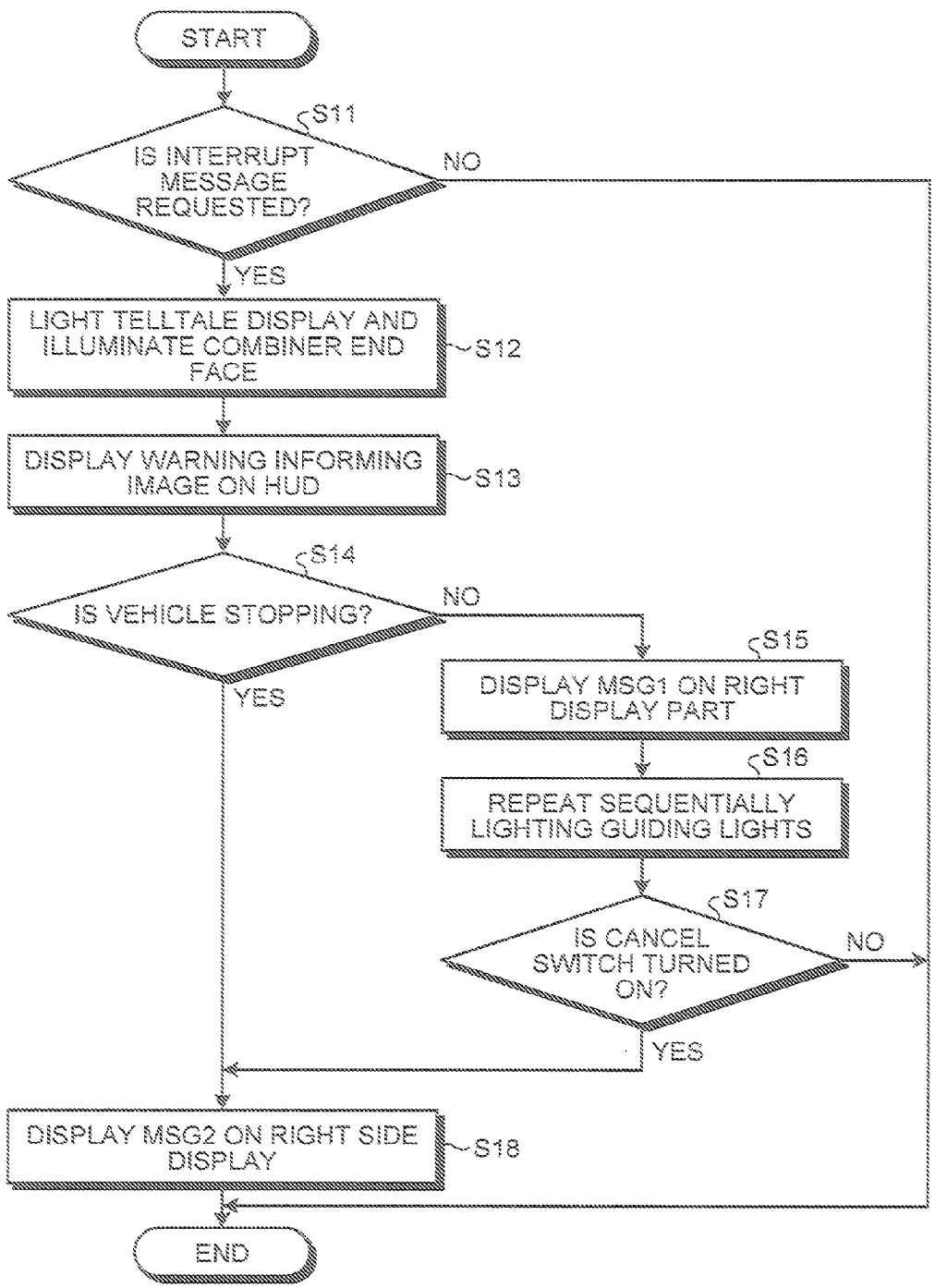
FIG. 16 is a flowchart illustrating an operation example regarding main control of the display unit.

FIG. 16 illustrates an operation example regarding main control of the display unit 10. Specifically, FIG. 16 illustrates details of display control for a warning, when the system has detected that a problem such as a failure in the vehicle has occurred.

FIG. 17 illustrates a display example of the entire display unit 10 displayed when the problem such as a failure in the vehicle has occurred. Execution of the process illustrated in FIG. 16 changes the display state of the display unit 10 to that illustrated in FIG. 17. To facilitate understanding of the operation of the display unit 10, an outline of display contents illustrated in FIG. 17 will first be described.

[Explanation of Exemplary Display]

As illustrated in FIG. 17, a HUD display area 107 (first display area) and an ambient display area 109 are defined in a display area provided on the display light reflective surface 17b of the combiner 17. The ambient display area 109 is an area allocated below and adjacent to the HUD display area 107. The guide lights 111a to 111f are displayed in the ambient display area 109.

The HUD display area 107 is a rectangular area with a display content thereof agreeing with the display content of the liquid crystal display 22g projected by the display-light projector 22. A HUD display content 94B that is a display content during warning display is displayed in the HUD display area 107. In FIG. 17, a warning informing element (triangular pattern containing a symbol of exclamation mark "!") 108 that is a display element for informing an occurrence of an abnormality is displayed instead of the indicator indicating a level of ecological friendliness.

The example illustrated in FIG. 17 assumes a situation in which an abnormality such as a failure has occurred, and, unlike in the normal state, a warning message MSG1 (content explanation element) is displayed as a right screen display content 92B in the second display area 13a of the right side display 13. The specific content of the warning message MSG1 is, for example, the following.

"'!' Brake may stop working. Stop vehicle immediately at safe place."

In other words, the right side display 13 displays thereon the text describing the content of warning of the warning informing element 108 displayed in the HUD display area 107 and instructions on how to act according to the warning, as the warning message MSG1. In the same manner as in the normal state illustrated in FIG. 6, the third display area 12a of the left side display 12 displays thereon, for example, the display elements indicating the state of the hybrid system, the speedometer, the fuel gauge, and the shift position of the transmission lever, as the left screen display content 91.

The following describes the guide lights 111a to 111f. As described above, lighting three of the light sources 28a, 28c, and 28e constituting the ambient light source 28 illustrated in FIG. 11 displays three of the guide lights 111a, 111c, and 111e, respectively, on the right side from the center of the ambient display area 109. Lighting three of the light sources 28b, 28d, and 28f constituting the ambient light source 28, displays three of the guide lights 111b, 111d, and 111e, respectively, on the left side from the center of the ambient display area 109.

For example, the light emitted from the light source 28a is projected on the combiner 17 via the prism 29a, and displayed as the guiding light 111a that is a virtual image on the central side of the ambient display area 109. In the same manner, the light from the light source 28c is displayed as the guiding light 111c that is a virtual image, and the light from the light source 28e is displayed as the guiding light 111e that is a virtual image. In other words, the three guide lights 111a, 111c, and 111e are displayed side by side in the ambient display area 109. The three guide lights 111a, 111c, and 111e are arranged in this order along an extending direction Y1 (first guide direction) of a straight line connecting the HUD display area 107 and the right side display 13, and the three guide lights 111b, 111d, and 111f are arranged in this order along an extending direction Y2 (second guide direction) of a straight line connecting the HUD display area 107 and the left side display 12.

As described above, because the present embodiment is configured so that the optical path length from each of the light sources to the eye point is larger in the order of the guide lights 111a, 111c, and 111e, the guide lights 111a, 111c, and 111e are viewed from the driver as lying further behind in this order. The same applies to the guide lights 111b, 111d, and 111f.

Lighting the light emitters 132a and 132b illustrated in FIG. 8 can display the guide lights 112a and 112b, respectively. In the same manner, lighting the light emitters 133a and 133b illustrated in FIG. 8 can display the guide lights 113a and 113b, respectively.

In the same manner as the guide lights 111a, 111c, and 111e in the ambient display area 109 described above, the guide lights 112a and 112b are arranged side by side along the first guide direction Y1. In the same manner as the guide lights 111b, 111d, and 111f in the ambient display area 109 described above, the guide lights 113a and 113b are arranged side by side along the second guide direction Y2. The first guide direction Y1 and the second guide direction Y2 intersect each other. As described above, the guiding light 112a is viewed as lying behind the guiding light 112b, and the guiding light 113a is viewed as lying behind the guiding light 113b.

The image forming positions of the guide lights will further be described with reference to FIGS. 18A and 18B. FIGS. 18A and 18B are explanatory diagrams for explaining the arrangement state of the respective guide lights used to guide the sight line, FIG. 18A being a diagram schematically illustrating the state of the display unit as viewed from the viewing direction, and FIG. 18B being a plan view illustrating image forming positions of the respective parts in FIG. 18A. FIG. 18A schematically illustrates the lighting positions of the guide lights 111a to 111f, 112a, 112b, 113a, and 113b using respective numerals thereof. FIG. 18B schematically illustrates the image forming position of display light defining the HUD display area 107 using numeral C, the image forming positions of the guide lights 111a, 111c, 111e, 112a, and 112b using numerals R1, R2, R3, R4, and R5, respectively, and the image forming positions of the guide lights 111b, 111d, 111f, 113a, and 113b using numerals L1, L2, L3, L4, and L5, respectively.

As illustrated in FIG. 18A, the image forming position of the display light is behind the image forming positions of the guide lights 111a to 111f. This is because the optical path length from the combiner 17 to the display-light projector 22 in the viewing direction (front-rear direction) is larger than the optical path lengths D1 to D3 from the combiner 17 to the respective light sources 28a to 28f, as described above. In more detail, the optical path length from the combiner 17 to the display-light projector 22, the optical path length D1 from the combiner 17 to the light sources 28a and 28b, the optical path length D2 from the combiner 17 to the light sources 28c and 28d, and the optical path length D3 from the combiner 17 to the light sources 28e and 28f are larger in this order.

As illustrated in FIG. 18B, the left side display 12 and the right side display 13 are disposed in front of the combiner 17 in the viewing direction (front-rear direction). As illustrated in FIG. 18A, the right side display 13 is disposed so that the second display area 13a lies outside the guide lights 111a, 111c, and 111e in the first guide direction Y1, when viewed from the viewing direction (front-rear direction). In the same manner, the left side display 12 is disposed so that the third display area 12a lies outside the guide lights 111b, 111d, and 111f in the second guide direction Y2, when viewed from the viewing direction (front-rear direction).

The guiding light 112a is disposed so as to be viewed as lying between the combiner 17 and the right side display 13 in the viewing direction (front-rear direction), and as lying between the guiding light 111e and the second display area 13a when viewed from the viewing direction. The guiding light 112b is disposed so as to be viewed as lying between the guiding light 112a and the right side display 13 in the viewing direction (front-rear direction), and as lying between the guiding light 112a and the second display area 13a when viewed from the viewing direction. In the same manner, the guiding light 113a is disposed so as to be viewed as lying between the combiner 17 and the left side display 12 in the viewing direction (front-rear direction), and as lying between the guiding light 111f and the third display area 12a when viewed from the viewing direction; and the guiding light 113b is disposed so as to be viewed as lying between the guiding light 113a and the left side display 12 in the viewing direction (front-rear direction), and as lying between the guiding light 113a and the third display area 12a when viewed from the viewing direction.

[Explanation of Processing Illustrated in FIG. 16]

The following describes the process of FIG. 16. The control process illustrated in FIG. 16 may be mainly performed by the main controller 51 or the sub-controller 52 of the meter unit 11, or may be mainly performed by the control unit 81 of the HUD device 16. The following description will be made assuming a case in which the main controller 51 mainly performs the control.

Turning on the ignition switch of the vehicle starts repeating the process illustrated in FIG. 16.

Immediately after the ignition switch is turned on, an initializing operation (not illustrated) is performed, which starts the display operations of the HUD device 16 and the meter unit 11. Specifically, the main controller 51 controls the left side display 12, the right side display 13, and the center display 14 of the meter unit 11 to be in a state of being capable of displaying, and displays information indicating states of various parts of the driver's own vehicle, such as the speedometer reading, the fuel gauge reading, and the shift position of the transmission lever, on the third display area 12a of the left side display 12. Representations such as warnings are displayed on the center display 14. In the HUD device 16, the electric motor 84 is driven to move the combiner 17 to the position of the use state protruding above the instrument panel. Furthermore, the main controller 51 starts the display of the liquid crystal display 22g of the display-light projector 22, and starts the projection of the display light displayed on the screen of the liquid crystal display 22g onto the combiner 17.

At Step S11 in FIG. 16, the main controller 51 determines whether an interrupt message is requested. If a request for an interrupt message is detected, the main controller 51 performs the next processing at Step S12, or if no request is detected, the process of FIG. 16 ends.

The interrupt message will be explained. The vehicle is equipped with an engine and various electrical components, and includes a plurality of electronic control units (ECUs) to control the engine and the electrical components. The electronic control units always monitor occurrences of failures or problems of, for example, the electrical components managed by the electronic control units, and when, for example, a failure is detected, generate a request for an interrupt message about a corresponding warning. This request is entered from, for example, the communication input part 72 or 76 illustrated in FIG. 15 into the main controller 51 via the communication network on the vehicle. If this request for an interrupt message is generated, the present embodiment determines that an event has occurred to guide the sight line outward in the first guide direction Y1, and performs a guiding operation of the sight line by the guide lights described below.

Then, at Step S12, the main controller 51 lights, for example, the telltale display (not illustrated) using the center display 14 to inform the occurrence of an abnormality in the vehicle. This allows the driver to view the telltale display on the center display 14, and notice that the occurrence of an abnormality is being reported. At Step S12, the main controller 51 also blinks the end face lighting source 46 by controlling the lighting state of the end face lighting source 46. As a result, the illumination light of the end face lighting source 46 is entered from the illumination light entrance portion 17a of the combiner 17, and the illumination light is reflected on the illumination light reflective portion 17c on the end face of the combiner 17, and advances toward the driver. Hence, by viewing the state in which the end face of the combiner 17 is brightly illuminated in a belt-shape as illustrated in FIG. 9A, the driver can notice that the occurrence of an abnormality is being reported.

At next Step S13, the main controller 51 instructs the HUD device 16 to display the warning informing element 108. The HUD device 16 changes the display content thereof according to this instruction. Specifically, the HUD device 16 changes the display content from the normal state of the HUD display content 94A illustrated in FIG. 6 to the HUD display content 94B illustrated in FIG. 17. In other words, the HUD device 16 displays the warning informing element 108 in the HUD display area 107 on the combiner 17, as illustrated in FIG. 17.

At Step S14, the main controller 51 determines whether the vehicle has stopped, with reference to the latest information on the vehicle speed. If the driver's own vehicle has stopped, the process proceeds from S14 to S18, or if the vehicle is running, the process proceeds to S15.

At Step S15, the main controller 51 gives the sub-controller 52 an instruction to display the warning message MSG1 on the screen of the meter right display 36R, that is, on the right side display 13. In other words, the sub-controller 52 changes the display content from the normal state of the right screen display content 92A illustrated in FIG. 6 to the right screen display content 92B illustrated in FIG. 17.

Figure 19A:
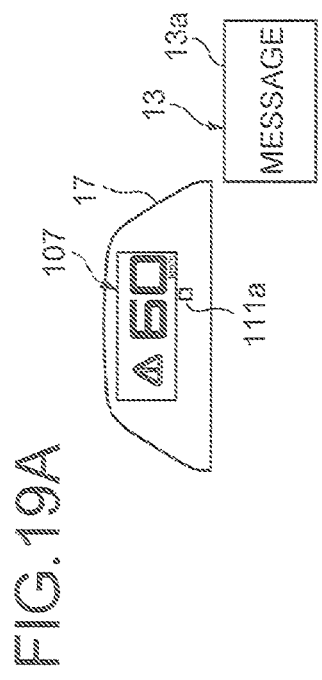
FIGS. 19A to 19E are explanatory diagrams for illustrating transition of lighting states of the respective guide lights in the warning display state.
Figure 19B:
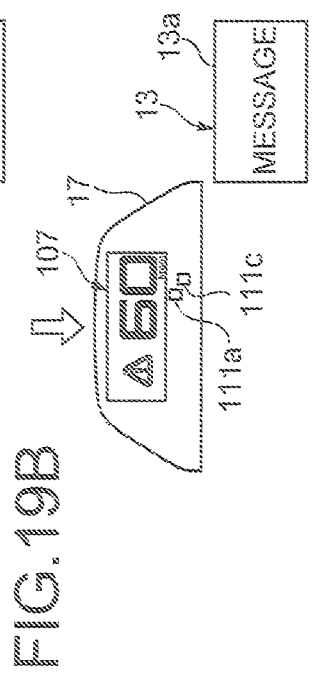
Figure 19C:
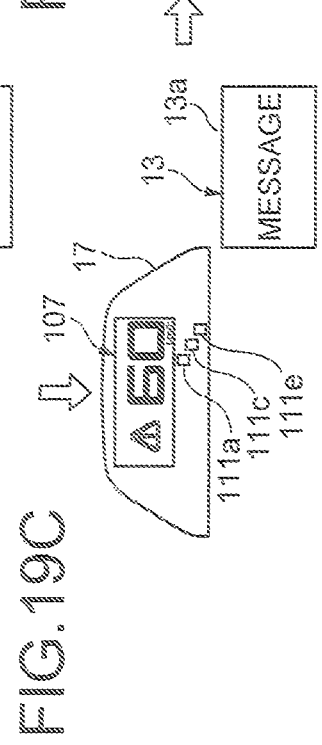
Figure 19E:
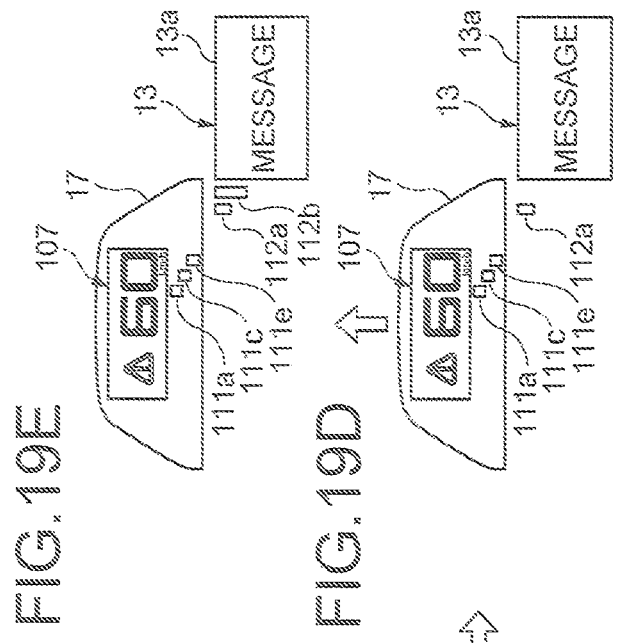
Figure 19D:
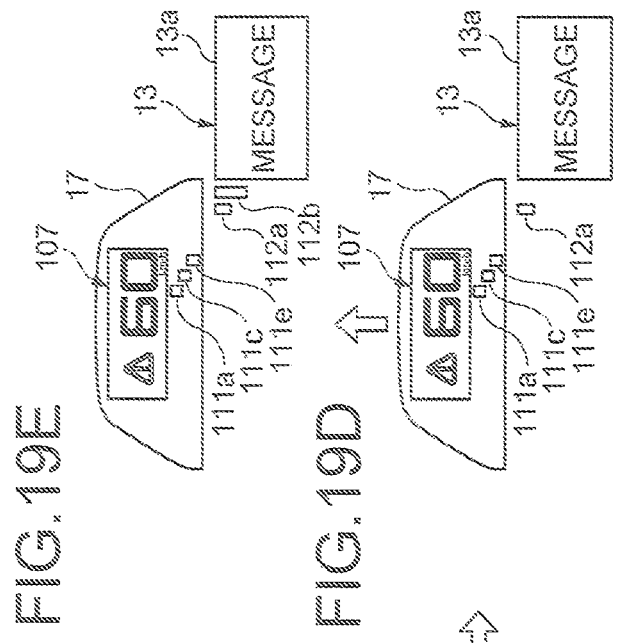

At Step S16, the main controller 51 performs guiding control for guiding the sight line of the driver from the HUD display area 107 to the right side display 13. Specifically, as illustrated in FIGS. 19A to 19E, the main controller 51 sequentially lights the guide lights 111a, 111c, 111e, 112a, and 112b one by one rightward. After lighting all of these five guide lights as illustrated in FIG. 19E, the main controller 51 switches them off again, and thereafter, sequentially lights again the guide lights 111a to the guide lights 112b one by one. The main controller 51 repeatedly performs these operations.

At Step S17, the main controller 51 waits for an operation of the cancel switch (not illustrated). The cancel switch is a switch operable by the driver, and is operated by the driver when the driver has viewed and been able to read the warning message MSG. The operation of the cancel switch by the driver causes the process to proceed from S17 to S18. If the cancel switch is not operated, the main controller 51 repeatedly performs the processing at Step S17, and waits for the operation of the cancel switch.

At Step S18, the main controller 51 gives the sub-controller 52 an instruction to display a predetermined warning message MSG2 (not illustrated) on the screen of the meter right display 36R, that is, on the second display area 13a of the right side display 13. A specific example of the warning message MSG2 is the following.

"'!' Failure occurred in brake system. Do not drive and have inspection immediately."

As a result, the occurrence of, for example, a failure in the vehicle leads to the display state illustrated in FIG. 17, and the driver first views the warning informing element 108 displayed on the HUD display area 107 that has the highest visibility. The driver comes to know that some kind of abnormality has occurred, but does not know what kind of abnormality has occurred or how to act accordingly, at this stage. Thereafter, the five guide lights 111a, 111c, 111e, 112a, and 112b are sequentially lit, so that the sight line of the driver is gradually guided from the warning informing element 108 to the right side display 13. Then, the driver views the warning message MSG1 displayed on the second display area 13a of the right side display 13. As a result, the driver can correctly understand the content of the abnormality and how to act, by viewing the warning message MSG1.

While the above-described process guides the sight line by sequentially lighting the five guide lights 111a, 111c, 111e, 112a, and 112b, the sight line only needs to be guided, and the order of lighting is not limited to this order. For example, the configuration may be such that the process is repeatedly performed in which the guide lights 111a, 111c, and 111e are simultaneously lit and then turned off, and the guide lights 112a and 112b are simultaneously lit and then turned off.

When displaying the five guide lights 111a, 111c, 111e, 112a, and 112b, the above-described process controls the luminescent colors of the light sources 28e, 28c, 28a, and 32b corresponding thereto to be red. In other words, only the red light-emitting diodes out of the red and the green light-emitting diodes are turned on to emit light. The configuration may be such that the red and the green light-emitting diodes are alternately lit, and the pattern of the luminescent colors is not limited.

While the above-described process represents the case of guiding the sight line from the HUD display area 107 toward the right side display 13, the warning message for explaining the content of the warning can be displayed on the third display area 12a of the left side display 12, and the sight line can be guided from the HUD display area 107 toward the left side display 12. Specifically, sequential lighting of the five guide lights 111b, 111d, 111f, 113a, and 113b in this order can guide the sight line from the HUD display area 107 toward the third display area 12a of the left side display 12.

As a result, the main controller 51 can appropriately switch the guide direction depending on the situation. Specifically, if the main controller 51 has detected a signal representing an event to guide the sight line from the HUD display area 107 toward the second display area 13a, the main controller 51 guides the sight line using the guide lights 111a, 111c, 111e, 112a, and 112b allocated on the right side. If the main controller 51 has detected a signal representing an event to guide the sight line from the HUD display area 107 toward the third display area 12a, the main controller 51 guides the sight line using the guide lights 111b, 111d, 111f, 113a, and 113b allocated on the left side.

While the above-described embodiment uses the reflective surface of the combiner 17 to perform the HUD display, for example, a part of the front windshield (window glass) of the vehicle can be substituted for the combiner 17 as a reflecting plate for the HUD device.

The following describes operations and effects of the HUD device 16 and the display unit 10 according to the embodiment of the present invention.

(1) The HUD device 16 according to the present embodiment includes the display-light projector 22 that projects the display light including the display image on the combiner 17, and a first light source (such as the light source 28a) and a second light source (such as the light source 28c) that project the output light on the combiner 17, and is used by being mounted on the vehicle. The display light from the display-light projector 22 is reflected in the viewing direction by the combiner 17, whereby the ambient display area 109 (first display area) is defined on the combiner 17. The output light from the light source 28a is reflected in the viewing direction by the combiner 17, whereby the guiding light 111a (first guiding light) is displayed in a position adjacent to the ambient display area 109 on the combiner 17. The output light from the light source 28c is reflected in the viewing direction by the combiner 17, whereby the guiding light 111c (second guiding light) is displayed outside the guiding light 111a on the combiner 17. The optical path length from the combiner 17 to the display-light projector 22, the optical path length (D1) from the combiner 17 to the light source 28a, and the optical path length (D2) from the combiner 17 to the light source 28b in the viewing direction are larger in this order.

The HUD device 16 can guide the sight line of the driver in a certain direction using the guide lights 111a and 111c. Displaying the guiding light 111c after displaying the guiding light 111a can guide the sight line of the driver in the first guide direction Y1 from the ambient display area 109 through the guiding light 111a toward the guiding light 111c. This can guide the sight line of the driver from the ambient display area 109 on the combiner 17 on which the warning informing element 108 that is a simple pattern is displayed to the right side display 13 of the meter unit 11 on which the detailed warning message MSG1 related to the warning informing element 108. In particular, in the HUD device 16, the optical path length of the display-light projector 22, the optical path length of the light source 28a, and the optical path length of the light source 28b are larger in this order. As a result, the guide lights 111a and 111c are viewed from the driver as lying in front of the display image on the ambient display area 109, and the guiding light 111a is viewed from the driver as lying behind the guiding light 111c. Hence, by lighting the light source 28c after lighting the light source 28a, the guiding light 111c is lit after the guiding light 111a, so that the focal position of the driver moves forward from the rear, in the order of the display image on the ambient display area 109 that is viewed as lying most behind, the guiding light 111a, and the guiding light 111c. As a result, if the combiner 17 is disposed on the rear side and the right side display 13 is disposed on the front side in the direction of the sight line, displaying the guiding light 111a and the guiding light 111c in this order moves the sight line of the driver from the combiner 17 to the right side display 13 without giving an uncomfortable feeling. Thus, the HUD device 16 easily guides the sight line of the driver.

While the above description has been made assuming the light source 28a to be the first light source, and the light source 28c to be the second light source, the light source 28c can be assumed to be the first light source, and the light source 28e can be assumed to be the second light source.

(2) In the HUD device 16 according to the present embodiment, when an event occurs to guide the sight line outward in the first guide direction Y1 from the ambient display area 109 through the guiding light 111a toward the guiding light 111c, the light source 28a displays the guiding light 111a, and thereafter, the light source 28b displays the guiding light 111c.

In this manner, because the guiding light 111c is displayed after the guiding light 111a is displayed, the sight line of the driver can be guided outward in the first guide direction Y1 from the ambient display area 109.

(3) The display unit 10 according to the present embodiment includes the HUD device 16 and the meter unit 11 that includes the right side display 13 on which the second display area 13a is defined. The right side display 13 is disposed in front of the combiner 17 in the viewing direction, and also disposed so that the second display area 13a lies outside in the first guide direction Y1 of the guiding light 111c when viewed from the viewing direction.

As a result, displaying the guiding light 111a and the guiding light 111c in this order moves the focal position of the driver forward from the rear, and moves the sight line of the driver from the combiner 17 disposed on the rear side to the right side display 13 disposed on the front side in the viewing direction without giving an uncomfortable feeling, whereby the sight line of the driver can surely be guided from the ambient display area 109 toward the second display area 13a.

(4) In the display unit 10 according to the present embodiment, in the case of displaying the warning display, the warning informing element 108 for informing the warning is displayed on the ambient display area 109, and the warning message MSG1 that is the content explanation element for explaining the content of the warning is displayed on the second display area 13a; and, after the light source 28a displays the guiding light 111a, the light source 28c displays the guiding light 111c.

This can guide the sight line of the driver from the ambient display area 109 on the combiner 17 on which the warning informing element 108 is displayed to the right side display 13 on which the warning message MSG1 that is the content explanation element is displayed.

(5) In the display unit 10 according to the present embodiment, the meter unit 11 further includes the light emitter 132a (first meter side light source) that displays the guiding light 112a (first meter side guiding light). The guiding light 112a is configured so as to be viewed as lying between the combiner 17 and the right side display 13 in the viewing direction, and as lying between the guiding light 111c and the second display area 13a when viewed from the viewing direction.

As a result, by displaying the guiding light 111a and then the guiding light 111c, and then lighting the guiding light 112a, the sight line of the driver can be guided from the ambient display area 109 toward the second display area 13a. In particular, the image forming positions are arranged from the rear in the order of the ambient display area 109, the guiding light 111a, the guiding light 111c, the guiding light 112a, the guiding light 112b, and the second display area 13a, so that the sight line of the driver can surely be guided from the ambient display area 109 to the second display area 13a.

(6) In the display unit 10 according to the present embodiment, the meter unit 11 further includes the light emitter 132b (second meter side light source) that displays the guiding light 112b (second meter side guiding light). The guiding light 112b is configured so as to be viewed as being disposed between the guiding light 112a and the right side display 13 in the viewing direction, and as lying between the guiding light 112a and the second display area 13a when viewed from the viewing direction.

As a result, by displaying the guiding light 111a and then the guiding light 111c, and then lighting the guiding light 112b after lighting the guiding light 112a, the sight line of the driver can be guided from the ambient display area 109 toward the second display area 13a. In particular, the image forming positions are arranged from the rear in the order of the display image on the ambient display area 109, the guiding light 111a, the guiding light 111c, the guiding light 112a, the guiding light 112b, and the second display area 13a, so that the sight line of the driver can surely be guided from the ambient display area 109 to the second display area 13a.

(7) In the display unit 10 according to the present embodiment, when an event occurs to guide the sight line outward in the first guide direction Y1 from the ambient display area 109, the light source 28a displays the guiding light 111a, and then the light source 28c displays the guiding light 111c, and thereafter, the light emitter 132a displays the guiding light 112a, and then the light emitter 132b displays the guiding light 112b.

As a result, because the light source 28a, the light source 28c, the light emitter 132a, and the light emitter 132b are sequentially lit, the sight line of the driver can be guided from the ambient display area 109 to the second display area 13a.

(8) The HUD device 16 according to the present embodiment further includes the light source 28b (third light source) and the light source 28d (fourth light source) that project the output light on the combiner 17. The output light from the light source 28b is reflected in the viewing direction by the combiner 17, whereby the guiding light 111b (third guiding light) is displayed in a position adjacent to the ambient display area 109 on the combiner 17. The output light from the light source 28d is reflected in the viewing direction by the combiner 17, whereby the guiding light 111d (fourth guiding light) is displayed in a position adjacent to the ambient display area 109 on the combiner 17. The optical path length from the combiner 17 to the display-light projector 22, the optical path length (D1) from the combiner 17 to the light source 28b, and the optical path length (D2) from the combiner 17 to the light source 28d in the viewing direction are larger in this order. The first guide direction Y1 intersects the second guide direction Y2 that passes through the third and the fourth guide lights.

As a result, the sight line of the driver can be guided in the second guide direction Y2 passing through the third and the fourth guide lights by using the guide lights 111b and 111d. The second guide direction Y2 intersects the first guide direction Y1 defined by the guide lights 111a and 111c. This allows the sight line of the driver to be guided in either of the first guide direction Y1 and the second guide direction Y2 intersecting each other.

(9) In the HUD device 16 according to the present embodiment, when an event occurs to guide the sight line outward in the first guide direction Y1 from the ambient display area 109, the light source 28a displays the guiding light 111a, and then the light source 28c displays the guiding light 111c, or when an event occurs to guide the sight line outward in the second guide direction Y2 from the ambient display area 109 through the guiding light 111b toward the guiding light 111d, the light source 28b displays the guiding light 111b, and then the light source 28d displays the guiding light 111d.

As a result, the sight line can be guided outward in the first guide direction Y1 by sequentially lighting the guide lights 111a and 111c, and can also be guided outward in the second guide direction Y2 by sequentially lighting the guide lights 111b and 111d.

The head-up display device according to one aspect of the present invention described above can guide the sight line of the driver in a certain direction by using the first and the second guide lights. For example, displaying the second guiding light after displaying the first guiding light can guide the sight line of the driver in the direction from the first display area through the first guiding light toward the second guiding light. This can guide the sight line of the driver, for example, from the first display area on the reflecting plate on which a simple pattern, such as the warning display, is displayed to the display part of the meter unit on which a detailed message related to the simple pattern is displayed. In particular, in the head-up display of item 1, the optical path length of the projector, the optical path length of the first light source, and the optical path length of the second light source are larger in this order, so that the first and the second guide lights are viewed from the driver as lying in front of the display image on the first display area, and the first guiding light is viewed from the driver as lying behind the second guiding light. Hence, by lighting the second light source after lighting the first light source, the second guiding light is lit after the first guiding light, so that the focal position of the driver moves forward from the rear, in the order of the display image on the first display area that is viewed as lying most behind, the first guiding light, and the second guiding light. As a result, if the reflecting plate is disposed on the rear side and the display part of the meter unit is disposed on the front side in the direction of the sight line, displaying the first guiding light and the second guiding light in this order moves the sight line of the driver from the reflecting plate to the display part of the meter unit without giving an uncomfortable feeling. Thus, the head-up display of item 1 easily guides the sight line of the driver.

The head-up display device according to another aspect of the present invention described above displays the second guiding light after displaying the first guiding light, and thereby can guide the sight line of the driver outward in the first guide direction from the first display area.

The display unit according to still another aspect of the present invention described above, displaying the first guiding light and the second guiding light in this order moves the focal position of the driver forward from the rear, and moves the sight line of the driver from the reflecting plate disposed on the rear side to the display part disposed on the front side in the viewing direction without giving an uncomfortable feeling, whereby the sight line of the driver can surely be guided from the first display area toward the second display area.

The display unit according to still another aspect of the present invention described above can guide the sight line of the driver from the first display area on the reflecting plate on which the warning informing element is displayed to the display part of the meter unit on which the content explanation element is displayed.

In the display unit according to still another aspect of the present invention described above, the first meter side guiding light is located between the reflecting plate and the display part in the viewing direction, and configured so as to be viewed as positioned between the second guiding light and the second display area when viewed from the viewing direction. As a result, by displaying the first guiding light and then the second guiding light, and then lighting the first meter side guiding light, the sight line of the driver can be guided from the first display area toward the second display area. In particular, image forming positions are arranged from the rear in the order of the first display area, the first guiding light, the second guiding light, the first meter side guiding light, and the second display area, so that the sight line of the driver can surely be guided from the first display area to the second display area.

In the display unit according to still another aspect of the present invention described above, the second meter side guiding light is disposed between the first meter side guiding light and the display part in the viewing direction, and configured so as to be viewed as positioned between the first meter side guiding light and the second display area when viewed from the viewing direction. As a result, by displaying the first guiding light and then the second guiding light, and then lighting the second meter side guiding light after lighting the first meter side guiding light, the sight line of the driver can be guided from the first display area toward the second display area. In particular, the image forming positions are arranged from the rear in the order of the first display area, the first guiding light, the second guiding light, the first meter side guiding light, the second meter side guiding light, and the second display area, so that the sight line of the driver can surely be guided from the first display area to the second display area.

The display unit according to still another aspect of the present invention described above sequentially lights the first light source, the second light source, the first meter side guiding light, and the second meter side guiding light, and thereby can surely guide the sight line of the driver from the first display area to the second display area.

The head-up display device according to still another aspect of the present invention described above can guide the sight line of the driver in the second guide direction passing through the third and the fourth guide lights by using the third and the fourth guide lights. The second guide direction intersects the first guide direction given by the first and the second guide lights. This allows the sight line of the driver to be guided in either of the first and the second guide directions intersecting each other.

The head-up display device according to still another aspect of the present invention can guide the sight line outward in the first guide direction by sequentially lighting the first and the second guide lights, and can also guide the sight line outward in the second guide direction by sequentially lighting the third and the fourth guide lights.

The head-up display device and the display unit according to the present invention can be provided as a head-up display device and a display unit that easily guide the sight line of a driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device for mounting on and for use with a vehicle, comprising:
   a projector configured to project display light including a display image onto a reflecting plate; and
   a first light source and a second light source configured to project emitted light onto the reflecting plate, wherein
   the display light from the projector is reflected by the reflecting plate in a viewing direction to define a first display area on the reflecting plate,
   the emitted light from the first light source is reflected by the reflecting plate in the viewing direction to display a first guiding light in a position adjacent to the first display area on the reflecting plate,
   the emitted light from the second light source is reflected by the reflecting plate in the viewing direction to display a second guiding light outside the first guiding light on the reflecting plate, and
   an optical path length from the reflecting plate to the projector is greater than an optical path length from the reflecting plate to the first light source, which is greater than an optical path length from the reflecting plate to the second light source in the viewing direction, wherein
   when an event involving a need to guide a sight line outward in a first guide direction from the first display area through the first guiding light toward the second guiding light has occurred, the first light source displays the first guiding light, and thereafter, the second light source displays the second guiding light.

2. A display unit comprising:
   the head-up display device according to claim 1; and
   a meter unit configured to include a display section on which a second display area is defined, wherein
   the display section is disposed in front of the reflecting plate in the viewing direction, and also disposed so that the second display area lies outside in a first guide direction of the second guiding light when viewed from the viewing direction.

3. The display unit according to claim 2, wherein
   when a warning display is displayed, a warning informing element for informing a warning is displayed on the first display area, and a content explanation element for explaining a content of the warning is displayed on the second display area, and
   the first light source displays the first guiding light, and thereafter, the second light source displays the second guiding light.

4. The display unit according to claim 3, wherein
   the meter unit further includes a first meter side light source that displays a first meter side guiding light, and
   the first meter side guiding light is located between the reflecting plate and the display section in the viewing direction, and configured so as to be viewed as positioned between the second guiding light and the second display area when viewed from the viewing direction.

5. The display unit according to claim 2, wherein
   the meter unit further includes a first meter side light source that displays a first meter side guiding light, and
   the first meter side guiding light is located between the reflecting plate and the display section in the viewing direction, and configured so as to be viewed as positioned between the second guiding light and the second display area when viewed from the viewing direction.

6. The display unit according to claim 5, wherein
   the meter unit further includes a second meter side light source that displays a second meter side guiding light, and
   the second meter side guiding light is disposed between the first meter side guiding light and the display section in the viewing direction, and configured so as to be viewed as positioned between the first meter side guiding light and the second display area when viewed from the viewing direction.

7. The display unit according to claim 6, wherein
   when an event involving a need to guide the sight line outward in the first guide direction from the first display area has occurred, the first light source displays the first guiding light, and then the second light source displays the second guiding light, and thereafter, the first meter side light source displays the first meter side guiding light, and then the second meter side light source displays the second meter side guiding light.

8. The head-up display device according to claim 1, further comprising:
   a third light source and a fourth light source configured to project emitted light onto the reflecting plate, wherein
   the emitted light from the third light source is reflected by the reflecting plate in the viewing direction to display a third guiding light in a position adjacent to the first display area on the reflecting plate,
   the emitted light from the fourth light source is reflected by the reflecting plate in the viewing direction to display a fourth guiding light outside the third guiding light on the reflecting plate,
   the optical path length from the reflecting plate to the projector is greater than an optical path length from the reflecting plate to the third light source, which is greater than an optical path length from the reflecting plate to the fourth light source in the viewing direction, and the first guide direction intersects a second guide direction that passes through the third guiding light and the fourth guiding light.

9. The head-up display device according to claim 8, wherein when an event involving a need to guide the sight line outward in the first guide direction from the first display area has occurred, the first light source displays the first guiding light, and thereafter, the second guiding light displays the second guiding light, or when an event involving a need to guide the sight line outward in the second guide direction from the first display area through the third guiding light toward the fourth guiding light has occurred, the third light source displays the third guiding light, and thereafter, the fourth light source displays the fourth guiding light.

* * * * *